(12) United States Patent
Tsapatsis et al.

(10) Patent No.: US 8,501,068 B2
(45) Date of Patent: Aug. 6, 2013

(54) LAYERED ZEOLITE MATERIALS AND METHODS RELATED THERETO

(75) Inventors: Michael Tsapatsis, Minneapolis, MN (US); Sudeep Maheshwari, Cambridge, MA (US); Frank S. Bates, St. Louis Park, MN (US); William J. Koros, Atlanta, GA (US)

(73) Assignees: Regents of the University of Minnesota, St. Paul, MN (US); Georgia Institute of Technology, Atlanta, GA (US)

( * ) Notice: Subject to any disclaimer, the term of this patent is extended or adjusted under 35 U.S.C. 154(b) by 458 days.

(21) Appl. No.: 12/741,178

(22) PCT Filed: Nov. 4, 2008

(86) PCT No.: PCT/US2008/012455
§ 371 (c)(1), (2), (4) Date: Sep. 7, 2010

(87) PCT Pub. No.: WO2009/108166
PCT Pub. Date: Sep. 3, 2009

(65) Prior Publication Data
US 2011/0040013 A1 Feb. 17, 2011

Related U.S. Application Data

(60) Provisional application No. 60/985,551, filed on Nov. 5, 2007.

(51) Int. Cl.
*B29C 71/00* (2006.01)
(52) U.S. Cl.
USPC ........... 264/233; 264/343; 264/344; 423/700; 423/718; 502/60

(58) Field of Classification Search
USPC ................. 264/233, 343, 344; 423/579, 700, 423/718; 502/60, 85
See application file for complete search history.

(56) References Cited

U.S. PATENT DOCUMENTS

| 5,266,541 A | 11/1993 | Kresge et al. |
| 5,278,115 A | 1/1994 | Kresge et al. |

(Continued)

FOREIGN PATENT DOCUMENTS

| WO | WO-9211935 | 7/1992 |
| WO | WO-03103854 A1 | 12/2003 |

(Continued)

OTHER PUBLICATIONS

"International Application Serial No. PCT/US2008/012455, Search Report mailed Sep. 22, 2009".

(Continued)

*Primary Examiner* — Joseph S Del Sole
*Assistant Examiner* — James Sanders
(74) *Attorney, Agent, or Firm* — Schwegman, Lundberg & Woessner, P.A.

(57) ABSTRACT

A novel oxide material (MIN-I) comprising $YO_2$; and $X_2O_3$, wherein Y is a tetravalent element and X is a trivalent element, wherein X/Y=O or Y/X=30 to 100 is provided. Surprisingly, MIN-I can be reversibly deswollen. MIN-I can further be combined with a polymer to produce a nanocomposite, depolymerized to produce predominantly fully exfoliated layers (MIN-2), and pillared to produce a pillared oxide material (MIN-3), analogous to MCM-36. The materials are useful in a wide range of applications, such as catalysts, thin films, membranes, and coatings.

10 Claims, 15 Drawing Sheets

U.S. PATENT DOCUMENTS

| | | | |
|---|---|---|---|
| 6,843,977 B2* | 1/2005 | Pinnavaia et al. | 423/702 |
| 6,936,560 B2 | 8/2005 | Mori et al. | |
| 7,087,228 B2 | 8/2006 | Goodman et al. | |
| 7,252,876 B2 | 8/2007 | Mori et al. | |
| 7,326,401 B2* | 2/2008 | Tatsumi et al. | 423/713 |
| 7,883,686 B2* | 2/2011 | Lai et al. | 423/700 |
| 2006/0105903 A1* | 5/2006 | Tatsumi et al. | 502/60 |
| 2006/0264318 A1* | 11/2006 | Shan et al. | 502/60 |
| 2007/0023957 A1 | 2/2007 | Kotov et al. | |

FOREIGN PATENT DOCUMENTS

| | | |
|---|---|---|
| WO | WO-2009108166 A2 | 9/2009 |
| WO | WO-2009108166 A3 | 11/2009 |

OTHER PUBLICATIONS

"International Application Serial No. PCT/US2008/012455, Written Opinion mailed Sep. 22, 2009".

Maheshwari, Sudeep, et al., "Layer Structure Preservatin during Swelling, Pillaring, and Exfoliation of a Zeolite Precursor", *J. Am. Chem. Soc.* 2008, 130 (2008), 1507-1516.

Tsapatsis, Michael, "Hierarchical Nano-Manufacturing of Zeolite Membranes", *AIChE conference*, Wednesday, Nov. 7, 2007—8:30 AM, (2007), 359a.

* cited by examiner

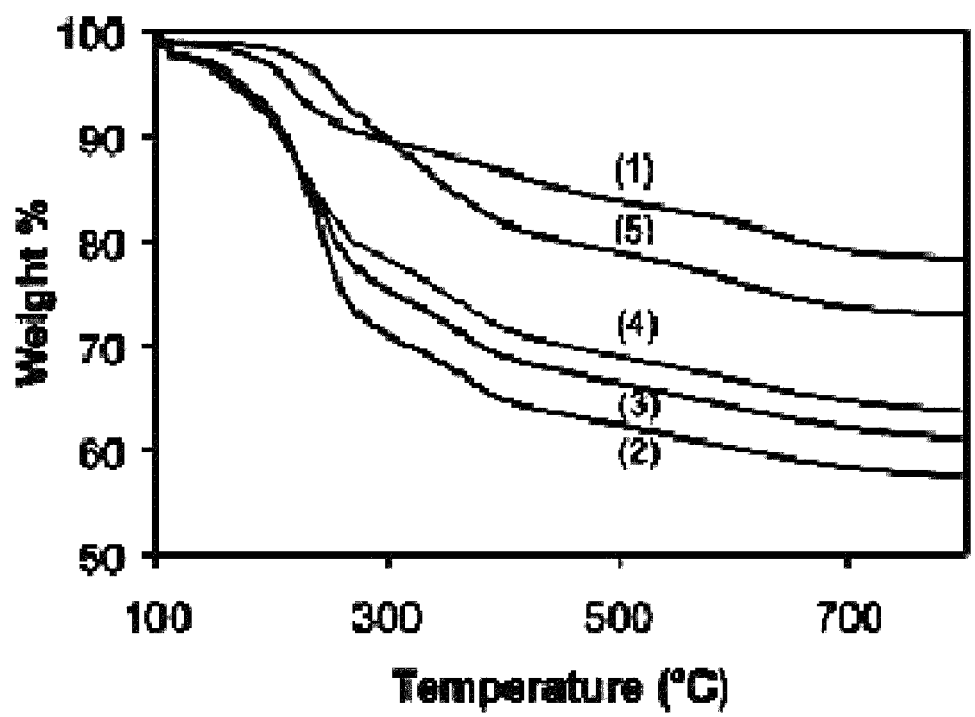
*Fig. 3*
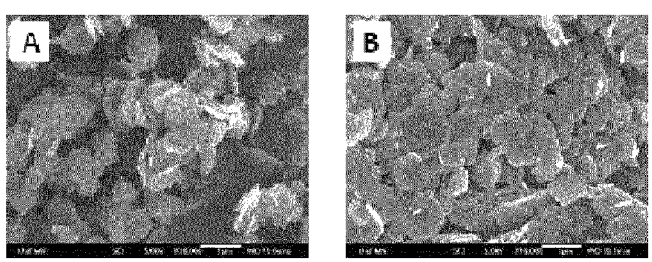
*Fig. 4A*
*Fig. 4B*
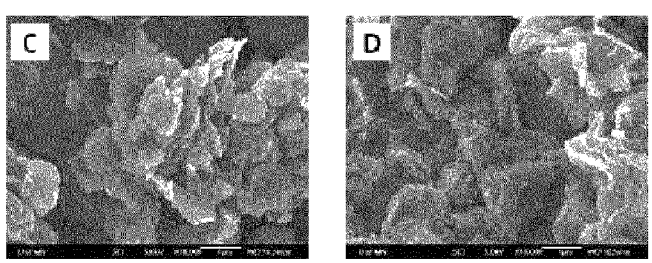
*Fig. 4C*
*Fig. 4D*

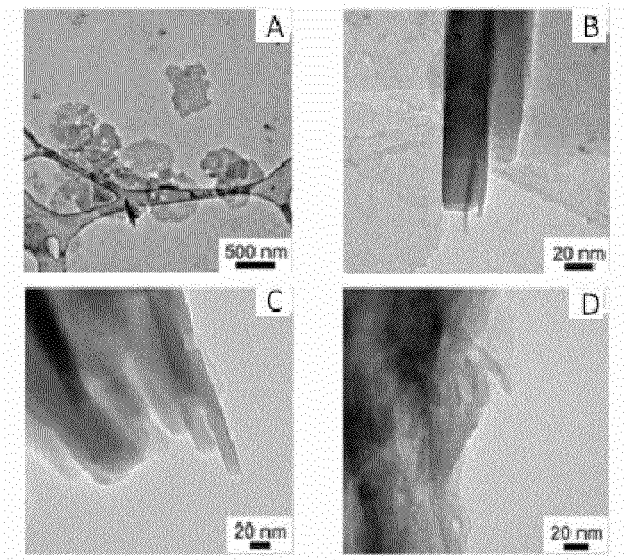
Fig.5A  Fig.5B  Fig.5C  Fig.5D
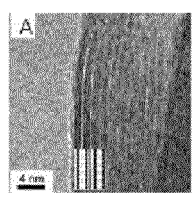 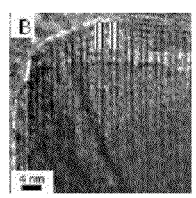 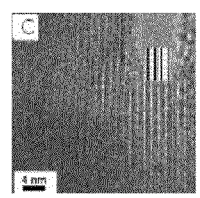
Fig.6A  Fig.6B  Fig.6C
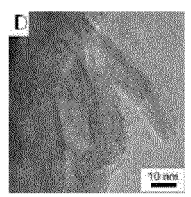 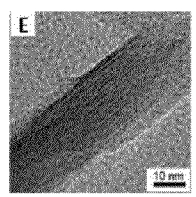 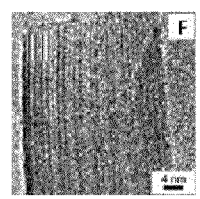
Fig.6D  Fig.6E  Fig.6F

LAYERED ZEOLITE MATERIALS AND METHODS RELATED THERETO

This application is a nationalization under 35 U.S.C. § 371 of PCT/US2008/012455, filed 4 Nov. 2008 and published as WO 2009/108166 A2 on 3 Sep. 2009, which document claims the benefit of priority, under 35 U.S.C. Section 119(e), of U.S. Provisional Patent Application Ser. No. 60/985,551, entitled NOVEL LAYERED ZEOLITE MATERIALS AND METHODS FOR MAKING AND USING SAME, filed on Nov. 5, 2007, which applications are hereby incorporated by reference in their entirety.

STATEMENT OF GOVERNMENT RIGHTS

This invention was made with support of the United States Government under National Science Foundation Contract CTS-0403574 and Department of Energy Award No, DE-FG26-04NT42119. The Government has certain rights in this invention.

BACKGROUND

Interest in porous lamellar solids, i.e., layered zeolite and related materials, has dramatically increased recently due to the discovery of new layered materials and new routes to modify existing lamellar zeolites. Materials with nanoporous layers have structures which are intermediate between crystalline nanoporous frameworks (e.g., zeolites) and typical layered materials (e.g., clay minerals). Each nanoporous layer includes a porous network while the gallery between layers allows for intercalation, pillaring and exfoliation.

SUMMARY

Embodiments of the invention provide novel oxide materials, thin films and coatings. In one embodiment, each of the novel oxides, thin films and coatings comprise $YO_2$ and $X_2O_3$, wherein Y is a tetravalent element and X is a trivalent element. In one embodiment X/Y=0. In one embodiment, Y/X=30 to 1000. In one embodiment, Y/X=40 to 100. In one embodiment, Y/X=40 to 50. In one embodiment, Y is silicon.

The materials produced herein are characterized by various means, such as x-ray diffraction (XRD) patterns. The peak height intensity, I, and positions, as a function of 2theta ($2\theta$), where $\theta$ is the Bragg angle, are determined using computer algorithms known in the art and associated with a diffractometer. (Specifically, $2\theta$ is converted into d(obs.) using Bragg's law). From this information, the relative peak intensities, $100\ I/I_0$, where $I_0$ is the intensity of the strongest line or peak and interplanar spacing "d (obs.)" in Angstrom Units (Å), may be determined.

In one embodiment, the novel oxide material is a novel swollen material referred to herein as "MIN-1," which is derived from MCM-22(P)." Surprisingly, and unlike conventional swollen MCM-22(P), MIN-1 is capable of being unswollen into substantially its original form (e.g., with an acid), such that it may be considered a reversibly swollen material. In one embodiment, MIN-1 has a powder X-ray diffraction pattern (hereinafter "XRD pattern"), comprising the values shown in Table 1A below:

TABLE 1A

| XRD Pattern of MIN-1 | |
|---|---|
| d(Å) | 100 $I/I_0$ |
| 40.7 ± 1.8 | vs |
| 20 ± 0.38 | w |
| 13.4 ± 0.17 | w |
| 12.3 ± 0.14 | w |
| 10.45 ± 0.1 | w |
| 9.3 ± 0.08 | w |
| 6.7 ± 0.04 | w |
| 4.4 ± 0.03 | w |
| 3.9 ± 0.03 | w |
| 3.5 ± 0.03 | w |
| 3.4 ± 0.03 | w |
| 3.3 ± 0.03 | w | wherein d(Å)=interplanar spacing;
I=peak height intensity;
$I_0$=intensity of strongest peak 100 $I/I_0$=relative peak intensity
vs=greater than 60 up to about 100; and
w=zero up to about 20.

In one embodiment, MIN-1 has a XRD pattern as shown in Table 1B.

TABLE 1B

| XRD Pattern of MIN-1 | |
|---|---|
| d(Å) | 100 $I/I_0$ |
| 40.7 | vs |
| 20.0 | w |
| 13.4 | w |
| 12.3 | w |
| 10.5 | w |
| 9.3 | w |
| 6.7 | w |
| 4.4 | w |
| 3.9 | w |
| 3.5 | w |
| 3.4 | w |
| 3.3 | w | wherein d(Å)=interplanar, spacing;
I=peak height intensity;
$I_0$=intensity of strongest peak 100 $I/I_0$=relative peak intensity
vs=greater than 60 up to about 100; and
w=zero up to about 20.

Additional peaks may be revealed upon better resolution of the XRD pattern, but none of said additional lines would have an intensity greater than the line at the d(Å) spacing of 12.3+/−0.14 or at 3.4+/−0.03,whichever is more intense. These values are different than the x-ray diffraction pattern of swollen MCM-22(9) prepared by conventional methods, as described herein.

MIN-1 can also be combined with a polymer to produce a nanocomposite material designated previously as "MIN-2," containing predominantly exfoliated layers together with a few intercalated crystals. (See U.S. Patent Application Ser. No. 60/985,551, hereinafter "'551"). However, in order to distinguish between a newer fully exfoliated and polymer-free MIN-2 material described below, the original MIN-2 material discussed in '551 is referred to herein as a "composite MIN-2" material or a "polymer-MIN-2 nanocomposite.

In one embodiment, a "composite MIN-2" material is produced by combining MIN-1 with a polymer having a glass transition temperature below about 150° C., to produce a material having predominantly exfoliated layers with a few intercalated crystals. In one embodiment, the polymer is polystyrene. In one embodiment, the polymer is a polypropylene, polyolefin, polymethacrylate, polyvinylalcohol, polyacrylamide, polycaprolactone, a copolymer of ethylene, a copolymer of propylene, a copolymer of acetate, a poly(ethylene terephthalate), polysulfone, polyimide, polyamidimide, polybenzaimidazole, or any combination thereof. The polymer may be further dissolvable in an organic solvent, a polar nonprotic solvent or any combination thereof.

In one embodiment, the polymer is removed from composite MIN-2, such as by depolymerization, to produce a novel, predominantly exfoliated material free of polymer referred to herein as "exfoliated MIN-2" or simply "MIN-2." MIN-2 is a powder containing highly crystalline, nano-thick zeolite layers. In one embodiment, "MIN-2" has a XRD pattern comprising the values shown in Table 2A below:

TABLE 2A

XRD Pattern of MIN-2

| d(Å) | 100 $I/I_0$ |
|---|---|
| 20.06 ± 1.35 | w-m |
| 12.20 ± 0.13 | vs |
| 10.93 ± 0.16 | s |
| 8.76 ± 0.09 | s |
| 6.80 ± 0.05 | w |
| 6.04 ± 0.04 | m-s |
| 5.52 ± 0.03 | w |
| 4.37 ± 0.03 | w |
| 3.89 ± 0.02 | m-s |
| 3.74 ± 0.02 | w-m |
| 3.51 ± 0.04 | w |
| 3.41 ± 0.01 | vs-m |
| 3.28 ± 0.01 | w |
| 3.17 ± 0.01 | w | wherein d(Å)=interplanar spacing;
I=peak height intensity;
$I_0$=intensity of strongest peak 100 $I/I_0$=relative peak intensity
vs=greater than 60 up to about 100;
s=greater than 40 up to about 60;
m=greater than 20 up to 40; and
w=zero up to about 20.

In one embodiment, MIN-2 has a XRD pattern comprising the values shown in Table 2B below.

TABLE 2B

XRD Pattern of MIN-2

| d(Å) | 100 $I/I_0$ |
|---|---|
| 20.06 | w-m |
| 12.20 | vs |
| 10.93 | s |
| 8.76 | s |
| 6.80 | w |
| 6.04 | m-s |
| 5.52 | w |
| 4.37 | w |
| 3.89 | m-s |
| 3.74 | w-m |
| 3.51 | w |
| 3.41 | vs-m |
| 3.28 | w |
| 3.17 | w | wherein d(Å)=interplanar, spacing;
I=peak height intensity;
$I_0$=intensity of strongest peak 100 $I/I_0$=relative peak intensity
vs=greater than 60 up to about 100;
s=greater than 40 up to about 60;
m=greater than 20 up to 40; and
w=zero up to about 20.

Additional peaks may be revealed upon better resolution of the XRD pattern, but none of said additional peaks would have an intensity greater than the peak at the d(A) spacing of 12.1+/−0.13 or at 3.41+/−0.01, whichever is more intense.

In one embodiment, MIN-1 is pillared to produce a novel catalytically active material analog to MCM-36, designated as MIN-3. In one embodiment, MIN-3 has a XRD pattern comprising the values shown in Table 3A below:

TABLE 3A

XRD Pattern of MIN-3

| d(Å) | 100 $I/I_0$ |
|---|---|
| 43.9 ± 1.9 | vs |
| 20.6 ± 0.4 | w |
| 15.1 ± 0.21 | w |
| 12.2 ± 0.14 | w |
| 10.7 ± 0.14 | w |
| 9.2 ± 0.14 | w |
| 6.9 ± 0.05 | w |
| 6.1 ± 0.04 | w |
| 4.4 ± 0.03 | w |
| 3.9 ± 0.03 | w |
| 3.5 ± 0.03 | w |
| 3.4 ± 0.03 | w |
| 3.3 ± 0.03 | w | wherein d(Å)=interplanar spacing;
I=peak height intensity;
$I_0$=intensity of strongest peak 100 $I/I_0$=relative peak intensity
vs=greater than 60 up to about 100; and
w=zero up to about 20.

In one embodiment, MIN-3 has a XRD pattern comprising the values shown in Table 3B below.

TABLE 3B

XRD Pattern of MIN-3

| d(Å) | 100 $I/I_0$ |
|---|---|
| 43.90 | vs |
| 20.57 | w |
| 15.09 | w |
| 12.18 | w |
| 10.70 | w |
| 9.2 | w |
| 6.88 | w |
| 6.09 | w |
| 4.41 | w |
| 3.93 | w |
| 3.52 | w |
| 3.39 | w |
| 3.31 | w | wherein d(Å)=interplanar spacing;
I=peak height intensity;
$I_0$=intensity of strongest peak 100 $I/I_0$=relative peak intensity
vs=greater than 60 up to about 100; and
w=zero up to about 20.

Additional peaks may be revealed upon better resolution of the XRD pattern, but none of said additional peaks would have an intensity greater than the peak at the d(A) spacing of 12.2+/−0.14 or at 3.4+/−0.03, whichever is more intense.

In one embodiment, the oxide materials are incorporated into films or coatings, which may be contained with a silica matrix. In one embodiment, the films or coatings are supported, such as on an alumina support.

In one embodiment, the invention further includes a method comprising reversibly swelling an oxide material to produce an unwashed swollen layered oxide material, the oxide material having a first layer structure; and washing the unwashed swollen layered oxide material with water to produce a washed swollen layered oxide material having a second layer structure substantially the same as the first layer structure and a X-ray diffraction pattern comprising:

| d(Å) | 100 I/I$_0$ |
|---|---|
| 40.7 ± 1.8 | vs |
| 20 ± 0.38 | w |
| 13.4 ± 0.17 | w |
| 12.3 ± 0.14 | w |
| 10.45 ± 0.1 | w |
| 9.3 ± 0.08 | w |
| 6.7 ± 0.04 | w |
| 4.4 ± 0.03 | w |
| 3.9 ± 0.03 | w |
| 3.5 ± 0.03 | w |
| 3.4 ± 0.03 | w |
| 3.3 ± 0.03 | w | wherein d(Å)=interplanar spacing;
I=peak height intensity;
I$_0$=intensity of strongest peak 100 I/I$_0$=relative peak intensity
vs=greater than 60 up to about 100; and
w=zero up to about 20.

In one embodiment, the second layer structure is the same as the first layer structure. In one embodiment, the oxide material is a layered oxide material, such as MCM-22(P). The washed swollen layered oxide material may be uniformly dispersed in a variety of organic solvents, including, but not limited to, toluene, xylene and so forth, to form stable dispersions useful in a variety of applications. In one embodiment, the oxide material is swollen at room temperature.

In one embodiment, the washed swollen layered oxide material comprises YO$_2$ and X$_2$O$_3$, wherein Y is a tetravalent element and X is a trivalent element, and X/Y=0. In one embodiment, Y/X=30 to 1000. In one embodiment, Y/X=40 to 100. In one embodiment, Y/X=40 to 50. In one embodiment, Y is silicon.

In one embodiment, the invention further includes a method comprising combining the washed layered swollen oxide material with a polymer to produce composite MIN-2. A composite MIN-2 material has layers of oxide material predominantly exfoliated by the polymer together with a few intercalated crystals. Such a composite may be made through known methods in the art, including, but not limited to, solvent casting or melt extrusion, with the choice of method dependent on many factors, such as the polymer used.

In one embodiment, the invention further includes a method for removing the polymer from the composite MIN-2 material to produce MIN-2 powder having a XRD pattern, such as the pattern shown in Tables 2A and 2B.

Various methods for removing the polymer from composite MIN-2 may be used. In one embodiment the composite MIN-2 is heated past its ceiling temperature to cause the depolymerization. Polymer removal may also be achieved by dissolution of the polymer in a solvent and separation of the suspended layers from the dissolved polymer by filtration or centrifugation. Polymer removal may also be achieved by simple calcination in air. The resulting exfoliated oxide powder is expected to be more stable and have improved properties as compared with conventional exfoliated oxide materials.

In one embodiment, the invention further comprises pillaring MIN-1 to produce MIN-3 having an XRD pattern, such as the pattern shown in Tables 3A and 3B. The resulting pillared oxide is expected to be more stable than the known pillared zeolite material, MCM-36.

In one embodiment, the invention further comprises forming a film or a coating on a support, such as an alumina or porous stainless steel support, although the invention is not so limited. Any of the various forms of the oxide material discussed herein may be used, including the swollen, composite, polymer-free and pillared oxide materials. In one embodiment, the film or coating comprises layers contained within a silica matrix. In one embodiment, the invention further comprises a product made according to any of the methods discussed herein.

In one embodiment, mixed matrix membranes are made by adding the exfoliated MIN-2 powder into a polymer, such as with a solvent casting step. Such membranes exhibit excellent separation properties. In one embodiment, a thin film is made by depositing the exfoliated MIN-2 powder onto a porous alumina support, such as with a layer-by-layer deposition process. Such films are expected to provide excellent separation properties.

In one embodiment, the invention further comprises using the various novel oxide materials described herein as membranes for separation, barrier, and corrosion protection applications.

These materials are also useful for improving the mechanical strength of polymeric materials, as polymer nanocomposite membranes for separations, as highly active catalytic materials, as coatings, and for improving the flame resistance of various materials.

BRIEF DESCRIPTION OF THE DRAWINGS

FIG. 3 shows TGA curves for (1) MCM-22(P); material Obtained by swelling MCM-22(P) after (2) 10 washes; MIN-1 material obtained by swelling MCM-22(P) after (3) 20 washes and, (4) 40 washes; and (5) deswollen MCM-22(P) obtained by acidification of MIN-1, in embodiments of the present invention.

FIG. 4A shows a SEM image of MCM-22(P) material.

FIG. 4B shows a SEM image of a material obtained by swelling MCM-22(P) after 10 washes in an embodiment of the present invention.

FIG. 4C shows a SEM image of a MIN-1 material obtained by swelling MCM-22(P) after 40 washes in an embodiment of the present invention.

FIG. 4D shows a SEM image of MCM-22(PS-80) in an embodiment of the present invention.

FIG. 5A shows a TEM image of a MCM-22(P) material perpendicular to layer thickness.

FIG. 5B shows a TEM image of a MCM-22(P) material edge-on-view

FIG. 5C shows a TEM image of MIN1 in an embodiment of the present invention.

FIG. 5D shows a TEM image of MCM-22(PS-80).

FIG. 6A shows a HRTEM image of a MCM-22(P) material.

FIG. 6B shows a HRTEM image of MIN-1 in an embodiment of the present invention.

FIG. 6C shows a HRTEM image of deswollen MCM-22(P) obtained by acidification of MIN-1 in an embodiment of the present invention.

FIGS. 6D, 6E and 6F show HRTEM images of MCM-22 (PS-80) in embodiments of the present invention.

DETAILED DESCRIPTION

Figure 1:
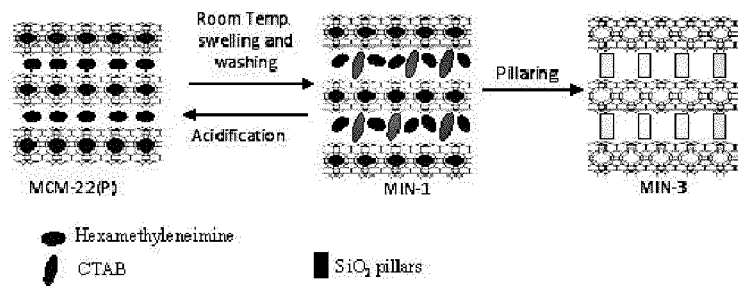
FIG. 1 illustrates a novel scheme for reversibly swelling MCM-22(P) to produce MIN-1, and for pillaring MIN-1 to produce MIN-3 in embodiments of the present invention.

In the following detailed description of embodiments of the invention, embodiments are described in sufficient detail to enable those skilled in the art to practice them, and it is to be understood that other embodiments may be utilized and that chemical and procedural changes may be made without departing from the spirit and scope of the present subject matter. The following detailed description is, therefore, not to be taken in a limiting sense, and the scope of embodiments of the present invention is defined only by the appended claims.

The Detailed Description that follows begins with a definition section followed by a brief background, a description of the embodiments, examples and a brief conclusion.

Definitions

As used herein, the term "MCM-22(P)" or "zeolite MCM-22(P)" (i.e., a precursor of MCM-22 defined below) refers to a layered material comprised of 2.5 nm thick sheets stacked in registry. Each sheet consists of a bidimensional 10-member ring (MR) sinusoidal channel pore system and large 12-MR cups on the crystal surface. These large cups are connected to each other through double 6-MR.

As used herein, the term "MCM-22" refers to a material produced by calcining MCM-22(P). Upon calcination, the layers of MCM-22(P) condense together to form a 3-D framework structure. See also U.S. Pat. No. 4,954,325 to Rubin.

As used herein, the term "MCM-22(PS-80)" refers to the material obtained by swelling MCM-22(P) according to methods described by Corma, et al, Nature (London) 1998, 396, (6709), 353-356.

As used herein, the term "ITQ-2" refers to a conventional layered material described in Corma, et al, Nature, 1998, 396, (6709), 353-356). ITQ-2 comprises a material with exfoliated layer. However, layer morphology and pore structure of this material is known to be partially destroyed.

As used herein, the term "MCM-36" refers to a pillared layered oxide material as described in U.S. Pat. No. 5,278,115 to Kresge (hereinafter '115).

As used herein, the term "MIN-1" refers to a novel structure prepared by swelling MCM-22(P) at room temperature and with successive washings sufficient to obtain the XRD pattern shown in any of traces c to e in FIG. 2.

As used herein, the term "exfoliated MIN-2" or "MIN-2," without further qualification, refers to a predominantly exfoliated MIN-1.

As used herein, the term "composite MIN-2" or polymer MIN-2 composite" refers to MIN-1 combined with a polymer, i.e., MIN-1 in a polymer matrix, resulting in at least 50% exfoliation of MIN-1.

As used herein, the term "MIN-3" refers to a MCM-36 analog obtained by pillaring MIN-1.

As used herein, the term "swelling" without any further qualification refers to increasing the thickness of the gallery by introducing an ionic or non-ionic surfactant or one or more other guest molecules into the gallery space.

As used herein, the term "intercalating" refers to a type of swelling which involves the introduction of an ionic or non-ionic surfactant or one or more other guest molecules into the gallery (space between the layers) of a host structure without any major structural changes in any layer of the host structure. The resulting product is an intercalated phase. Structural changes which occur include increased gallery spacing (i.e., thickness) and only minor changes of the layer structure. Minor changes include, for example, a change in bond angles and atomic positions with minimal or no corresponding change in atom connectivity.

As used herein, the term "exfoliation" without any further qualification refers to separating the layers of a layered material to an extent such that layers lose correlation or registry with each other.

As used herein, the term "repeatedly washing" refers to a process of dispersing a product in a suitable amount of freshly distilled water, separating the product from water by centrifugation, removing the water from the centrifuge, and then repeating the entire process again until the desired result is achieved. Such a desired result includes, for example, washing the swollen material having a XRD pattern shown in trace b of FIG. 2 until it converts into MIN-1 with a XRD pattern shown in any of traces c to e FIG. 2.

As used herein, the term "ceiling temperature" refers to a temperature above which a polymer is thermodynamically unstable and disintegrates into monomer molecules.

As used herein, the term "depolymerization" refers to a process of converting a polymer to its monomer or other small and volatile molecules. Depolymerization is typically achieved by heating a polymer above its ceiling temperature.

As used herein, the term "film" refers to a thin film having a thickness of less than about 10 micron.

As used herein, the term "membrane" refers to a film capable of performing separations.

As used herein, the term "zeolite" refers to a crystalline microporous oxide material.

Background Discussion

MCM-22(P), the precursor to MCM-22, consists of stacks of layers which can be swollen, and subsequently pillared with silica (i.e. MCM-36) or exfoliated to produce catalytically active materials (ITQ-2).

Fabrication of polymer nanocomposites with layered materials requires intercalation of polymer chains in between the layers. To facilitate the intercalation, layered materials (e.g., clays) are often swollen with organic surfactant to increase the inter-layer spacing. The increased inter-layer spacing allows intercalation of polymer chains resulting in nanocomposites with intercalated and/or exfoliated morphology.

Conventional swelling procedures, however, result in significant degradation of crystal morphology (i.e., greater than about 50 wt %), along with partial loss of crystallinity (i.e., greater than about 50 wt %), and dissolution of the crystalline phase (larger than about five (5) wt %). Therefore, materials derived from swollen MCM-22(P). MCM-36 and ITQ-2, are known to have reduced crystallinity.

For example, swelling of MCM-22(P) by treatment with tetrapropyl ammonium hydroxide (TPAOH) and cetyltrimethylammonium bromide (CTAB) at elevated temperature and high pH results in layer fragmentation in excess of about 50% along with partial dissolution of the framework silica, i.e., in excess of about five (5) wt %. There is also a significant reduction in Si/Al ratio (from 47 to 13) as a result of silica dissolution. Moreover, the amorphous silica produced by the dissolution of crystals may have an undesirable influence over the transport and separation properties of the membrane and may also cause processing problems during nanocomposite fabrication (e.g., due to aggregation).

Description OF Embodiments

Embodiments of the invention provide novel oxide materials referred to herein as MIN-1, composite MIN-2, MIN-2 and MIN-3 and methods of making and using same. These materials are useful in a number of applications, including as films, which are useful in separation, barrier, and corrosion protection applications. These materials are also useful for improving the mechanical strength of polymeric materials, as polymer nanocomposite membranes for separations, as highly active catalytic materials, as coatings, and to improve flame resistance of various materials. The novel materials described herein have improved properties in all of the aforementioned applications as compared to conventional zeolites.

The present invention further includes various methods for producing the novel materials described herein. In one embodiment, the invention comprises a method for producing nano-thick layers of a zeolite material by separating layers (i.e., exfoliating the layers) present in a swollen zeolite material in a polymer matrix, such as by a melt compounding technique, and then removing the polymer by depolymerization. The resulting material comprises high surface area fully exfoliated nano-thick layers, i.e., an exfoliated zeolite. In one embodiment, the resulting material is MIN-2, as defined herein.

In contrast to conventional exfoliated materials, destruction of the pore structure of the zeolite layers in these novel materials is significantly reduced. In one embodiment, the pore structure is retained completely intact. In one embodiment, the pore structure is retained substantially intact, i.e., such that over 90% of the original pore structure is retained. Such improved pore structure is expected to produce higher selectivity in products obtained from certain catalytic reactions, including, but not limited to, xylene isomerization, vacuum gasoil cracking and alkylation of benzene.

The novel materials further exhibit higher preservation of crystal morphology. In one embodiment, crystal morphology is retained completely intact. In one embodiment, crystal morphology is substantially intact, i.e., such that over 90% of the original crystal morphology is retained. Retaining such crystal morphology reduces layer fragmentation, thereby producing high aspect ratio layered materials, i.e., an aspect ratio of at least about ten (10) or higher, such as up to at least about 25. High aspect ratio nano-thick layers are highly desirable for polymer based nanocomposites and thin zeolite films. A high aspect ratio imparts greater separation capabilities to a nanocomposite even at small zeolite loadings, i.e., zeolite loadings as low as about two (2) wt %. A high aspect ratio further allows formation of continuous coatings with more uniform coverage of substrates as compared to low aspect ratio materials.

The novel materials further have a high silica content of at least about 80 wt % of starting material. In one embodiment, the silica content is greater than about 90 wt % up to about 99 wt % of starting material. This is in contrast to conventional methods, in which as much as about 70 wt % of the silica is dissolved, thus significantly reducing the silica content. As a result, the novel materials discussed herein are expected to be more stable and more selective than conventional zeolite catalysts for a variety of catalytic applications.

MIN-1

In one embodiment, MCM-22(P) is swelled under mild conditions without disruption of the layered structure and repeatedly washed with water, such as distilled water, to produce a novel swollen material designated as MIN-1. This material has a novel XRD pattern as shown above in Tables 1A and 1B. Such a diffraction pattern is in contrast with the diffraction pattern for swollen MCM-22(P) as shown in Table 5 of '115. (See, for example, col. 8, lines 1-19 of '115). Applicant is the first to report additional peaks in a swollen layered oxide material derived from MCM-22(P) with a d(Å) spacing greater than a line at 12.41±0.25 Å and less than a line at 32.2 Å, and an intensity comparable to that of the 12.41±0.25 Å line. For example, see the peaks listed in the second and third entries of Tables 1A and 1B. Specifically, for Table 1A: d(Å.)=20±0.38; 100 I/$I_0$=w and d(Å)=13.4±0.17; 100 I/$I_0$=w. For Table 1B: d(Å)=20.0; 100I/$I_0$=w and d(Å)

=13.4; 100 I/I$_0$=w. See FIG. 2 in Example 1 which shows XRD curves for MIN-1 and other materials. Applicant is also the first to report additional peaks in a swollen layered oxide material derived from MCM-22(P) with a d(Å) spacing greater than a line at 12.3±0.14 Å and less than a line at 40.7±1.8 Å and an intensity comparable to that of the 12.3±0.14 Å line.

In one embodiment, a method comprising swelling MCM-22(P) without altering the crystal morphology and layer structure and preserving the high aspect ratio of the layers with minimal dissolution of framework silica is provided. In one embodiment, the method comprises using cetyltrimethylammonium bromide (CTAB) and tetrapropylammonium hydroxide (TPAOH) at room temperature with multiple washings to produce swollen MCM-22(P), designated herein as "MIN-1." The resultant novel material designated MIN-1 is highly ordered with increased interlayer spacing and a distinct XRD pattern as shown in Tables 1A and 1B. In one embodiment, the swelling process does not disrupt the framework connectivity present in the parent MCM-22(P) material.

As noted above, with the reduction in fragmentation of layers by the swelling procedure described above, high aspect ratio layered materials result. Such materials are highly desirable for polymer based nanocomposites and thin films, e.g., thin zeolite films. Additionally, a high aspect ratio imparts greater separation capabilities to nanocomposites, even at small oxide loadings. A high aspect ratio also allows formation of continuous coatings with more uniform coverage of substrates.

Surprisingly, and in contrast to known methods of swelling, the novel method of swelling described herein is reversible. Specifically, the swollen MIN-1 material may be converted back (deswollen) to MCM-22(P). The demonstrated reversibility of the novel MIN-1 material described herein verifies that the layer structures in MCM-22(P) are preserved in the MIN-1 material. In contrast, MCM-22(P)-derived MCM-22(PS-80) cannot be converted back to MCM-22(P).

In one embodiment, MIN-1 is uniformly dispersed in a variety of organic solvents to form stable dispersions. Such solvents include, but are not limited to, toluene, xylene and so forth, to form stable dispersions. In one embodiment, stable dispersions of these materials are used for a variety of applications, including, but not limited to, MIN-1 zeolite films produced by simple casting techniques for separation applications and as corrosion resistant coatings. In one embodiment, MIN-1 is dispersed in water or other polar solvents and solvent mixtures to form multilayer films using any known method, such as layer-by-layer ionic assembly.

Composite MIN-2

In one embodiment, MIN-1 may also be exfoliated within a polymer matrix to produce a nanocomposite designated herein as "composite MIN-2" or "polymer MIN-2 nanocomposite," as defined above. Any suitable polymer can be used to produce the nanocomposite. The polymer may be further dissolvable in an organic solvent, a polar nonprotic solvent or any combination thereof.

In one embodiment, a novel composite MIN-2 material is made using a polymer having a glass transition temperature below 150° C. In one embodiment, a novel composite MIN-2 material is made by melt extrusion using a polypropylene, polyolefin, polystyrene, polymethacrylate, polyvinylalcohol, polyacrylamide, polycaprolactone, a copolymer of ethylene, propylene or acetate, a poly (ethylene terephthalate), nylon, or any combination thereof. In one embodiment, the novel nanocomposite material is made with solution casting using any polymer noted above or polysulfone, polyimide, polyamidimide, polybenzaimidazole and other polymers which are dissolvable in organic or polar nonprotic solvents. These materials exhibit an exfoliated morphology of layers.

Such materials are useful for a wide variety of applications as discussed herein, including, but not limited to, membrane based separation applications and for improving mechanical properties of polymers.

Exfoliated MIN-2

In one embodiment, a novel exfoliated material designated herein as "MIN-2" is produced from composite MIN-2 by heating composite MIN-2 to above its ceiling temperature. In one embodiment, any remaining fragments, including any remaining monomer are removed, such as with vacuum and/or calcination treatments. MIN-2 also has a novel XRD pattern as shown above in Tables 2A and 2B.

In one embodiment, the novel swelling procedure described herein does not reduce the silica content of the zeolites or otherwise minimizes silica reduction, and otherwise affects the crystal structure to a lesser extent than the conventional process, the resulting MIN-2 powder is likely to exhibit improved catalytic and stability properties as compared to ITQ-2.

In one embodiment, the exfoliated MIN-2 is added to a polymer via a solvent casting step to produce mixed matrix membranes having separation capabilities (See Example 4). In one embodiment, the novel-MIN-2 material is deposited layer-by layer to form an inorganic membrane in a process referred to as layer-by-layer assembly (LBL). (See Example 6).

LBL is a method of thin film deposition which is useful for oppositely charged polymers and for making polymer-nanoparticle films. LBL can be applied to a variety of water soluble materials and is especially suited for the fabrication of stratified thin films in which layers of nanometer thickness are organized in a specific order. Such materials in one layer have an affinity for materials in adjacent layers via electrostatic interaction, van der Waal's forces or hydrogen bond forces.

Typically, layer-by-layer films are assembled on a solid substrate material. Deposition of the film material onto the substrate is performed in a cyclic manner, made possible by the overcompensation of surface charge which often takes place when polyelectrolytes and other high molecular weight species are adsorbed on a solid-liquid interface. For example, a polyelectrolyte-nanoparticle film may be deposited on a substrate by repeating the process of: 1) immersion of the substrate in an aqueous solution of polyelectrolyte; 2) washing with neat solvent and drying; 3) immersion in an aqueous dispersion of nanoparticles; and 4) final washing with neat solvent and drying. This process is repeated as necessary, until the required numbers of layers are deposited to obtain the specific properties of the desired material.

In one embodiment, the exfoliated MIN-2 is deposited onto a porous alumina support to produce a thin film. Such films are expected to have superior separation performance, as discussed in Prophetic Example 7. A demonstration of the performance of MCM-22/silica films in Example 5 further confirms the expected superior separation performance expected with the MIN-2 materials.

MIN-3

In one embodiment; MIN-1 is pillared to produce a novel catalytically active material analog to the MCM-36 material shown in '115, designated herein as MIN-3. This material also has a novel XRD pattern as shown above in Tables 3A and 3B. This diffraction pattern is in contrast with the diffraction pattern for pillared MCM-22(P) as shown in Table 7 of '115 (See, for example, col. 8, lines 40-66). Applicant is the first to report additional peaks in a pillared layered oxide material with a d(Å) spacing greater than a line at 12.38±0.25

Å, less than a line at 32.2 Å, and an intensity comparable to that of the 12.2±0.14 Å line. For example, see the peaks listed in the second and third entries of Tables 3A and 3B. Specifically, for Table 2A: d(Å)=20.6±0.4; $I/I_0$=w and d(Å) =15.1±0.21; $I/I_0$=w. For Table 3B: d(Å)=20.57; $I/I_0$=w and d(Å)=15.09; $I/I_0$=w. Applicant is also the first to report additional peaks in a pillared layered oxide material derived from MCM-22(P) with a d(Å) spacing greater than a line at 12.2±0.14 Å and less than a line at 43.9±1.9 Å and an intensity comparable to that of the 12.2±0.14 Å line.

As noted above, since the novel swelling procedure described herein minimizes or eliminates reduction of silica content, and otherwise affects the crystal structure to a lesser extent than the conventional process, the resulting pillared material, MIN-3, is likely to exhibit improved catalytic and stability properties relative to the conventional pillared catalytic material MCM-36.

The invention will be further described by reference to the following examples, which are offered to further illustrate various embodiments of the present invention. It should be understood, however, that many variations and modifications may be made while remaining within the scope of the present invention.

EXAMPLE 1

In this example MCM-22(P) is synthesized and then swollen at room temperature to form a highly ordered material designated herein as MIN-1. As demonstrated herein, there is no destruction of crystal morphology in MIN-1 that can be detected by microscopy investigation, although elemental analysis shows a small decrease (i.e., <ten (10) %) of silicon from framework, i.e., original crystalline morphology is retained. The reversibility of the swelling step is also demonstrated in Example 1. MIN-1 was also successfully pillared to produce an analog of MCM-36 designated herein as MIN-3. These steps are depicted in the scheme shown in FIG. 1.

Materials were characterized and the above properties were confirmed using powder x-ray diffraction (XRD), scanning electron microscopy (SEM), transmission electron microscopy (TEM) and elemental analysis.

Stable dispersions of MIN-1 were also prepared in toluene, xylene, benzene and acetone. An intercalated/exfoliated nanocomposite starting with polystyrene and MIN-1, referred to herein as a composite MIN-2, was also produced.
Synthesis of MCM-22(P)

MCM-22(P) was synthesized using the method described by Corma et al., Journal of Catalysis 1999, 186, (1), 57-63 and Corma, et al, Nature (London) 1998, 396, (6709), 353-356, (hereinafter "Corma 1998 and 1999"). 0.72 g of sodium aluminate (MP Biomedicals, USA) and 2.48 g of sodium hydroxide (97+%, Fisher-Scientific, Watham, Mass.) were dissolved in 311 g of distilled water. Subsequently, 19.1 g of hexamethyleneimine (HMI) (Sigma-Aldrich, St. Louis, Mo.) and 23.6 g of fumed silica (Cab-o-sil M5, Cabot Corp., Boston, Mass.) were added to the mixture. The mixture was allowed to stir for 5 h at room temperature using a magnetic stirrer, followed by 11 days in rotating Teflon®-lined steel autoclaves at 408° K. The crystalline product obtained after 11 days was collected by centrifugation at 10,000 rpm followed by "repeatedly washing" with distilled water as defined herein until the pH of washing water became less than 9. A portion of the crystalline product was calcined at 540° C. under air for 12 h to produce MCM-22(P).

Swelling MCM-22(P) to Produce MIN-1: Pillaring of MIN-1 to Produce MIN-3

MCM-22(P) was swollen with CTAB (Sigma-Aldrich, St. Louis, Mo.) at room temperature under high pH conditions. The composition of the swelling mixture was the same as reported by Corma 1998 and 1999, among others. Nine (9) g of aqueous slurry of MCM-22(P) (20 weight percent solids) was mixed with 35 g of an aqueous solution of 29 weight percent CTAB and 11 g of an aqueous solution of 40 weight percent TPAOH (Alfa Aesar, Wardhill, Mass.). The pH of the resulting mixture was 13.8. The mixture was stirred using a magnetic stirrer for 16 h at room temperature, after which the particles were recovered by repeated cycles of centrifugation (IEC Multi, Thermo Fisher Scientific, Waltham, Mass.) and water washing (10 min centrifugation at 10,000 rpm, removing water and redispersion in fresh distilled water). The number of (centrifugation/Water washing) cycles was systematically varied from 10 to 40 to study its effect on the recorded XRD patterns. For comparison, a portion of MCM-22(P) was also swollen at elevated temperature (80° C.) following the procedure reported by Corma 1998 and 1999.

Pillaring of the swollen material was performed according to the procedure reported by Barth, J.-O.; Kornatowski, J.; Lercher, J. A. Journal of Materials Chemistry 2002, 12, (2), 369-373. One (1) g of swollen MCM-22(P) powder was mixed with 5 g of TEOS (tetraethoxysilane, Sigma-Aldrich), stirred for 25 h at 351 K under an argon atmosphere, then filtered and dried at room temperature. The dried solid (0.5 g) was hydrolyzed with water (5 g, pH~8, controlled with sodium hydroxide (97+%, Fisher-Scientific, Waltham, Mass.) for 6 h at 313 K, and then filtered, dried at 300° K. and calcined at 723° K. under $N_2$ flow (140 ml $min^{-1}$) for 6 h and finally at 823° K. under air for 12 h (temperature ramp rate of 2 K/min).
"MIN-2 Composite" Fabrication
Nanocomposite from Solution Casting Techniques Nanocomposites of room temperature swollen MCM-22 (P) and polystyrene were prepared using solvent casting technique known in the art (see Choi S. et. al, Journal of Membrane Science, 2008, (1-2), 145-152). A two (2) weight percent dispersion of swollen MCM-22(P) was prepared in toluene (Sigma-Aldrich). To assist homogeneous dispersion, the mixture was subjected to ten (10) cycles of sonication (Branson 5510, Emerson Electric Co., St. Louis, Mo.), and refluxing (6 h sonication, 6 h refluxing). The resulting dispersion (1 g) was mixed with 1 g of 2 weight percent polystyrene ($M_n$=5400) solution in toluene and stirred using a magnetic stirrer for 5 days. Subsequently, the mixture was heated for 2 h at 110° C., followed by addition of 5 g of 20 weight percent solution of polystyrene ($M_w$=45000, Sigma-Aldrich), further heating (2 h, 110° C.), sonication (1 h) and finally spreading the solution on a Teflon® surface (15 cm×10 cm). The solvent was evaporated slowly over a period of 5 days and the composite was peeled off the surface.
Nanocomposite from Melt Compounding Techniques Nanocomposites were prepared by melt blending in a DACA Mini Compounder vertical, co-rotating twin screw extruder (DACA Instruments, Santa Barbara, Calif.), with a re-circulation channel. Polystyrene (3.8 g, $M_w$=45000, Sigma-Aldrich) and MIN-1 (0.16 g) were mixed manually and loaded into the compounder preheated to 120° C. The mixture was blended at a screw speed of 350 rpm for 15 min under nitrogen and subsequently extruded out. A circular disc (25 mm×1 mm) was prepared by compressing the extrudate 1000 psi and 150° C. for 10 min.
Characterization Methods The silicon and aluminum contents of MCM-22(P), and of the novel swollen materials (MIN-1), were determined by Galbraith Laboratories, Knoxville, Tenn.

XRD patterns were collected on a Bruker AXS D5005 diffractometer (Bruker AXS Inc., Madison, Wis.) using standard techniques.

Thermogravimetric analysis (TGA) was performed to estimate the amount of organic contents in MCM-22(P) and novel swollen materials (MIN-1). Experiments were carried out under air in the temperature range of 110-800° C. (heating rate 10° C./min on a Perkin-Elmer TGA-7 analyzer (Perkin Elmer, Waltham, Mass.).

The crystal morphologies of various materials were examined by scanning electron microscopy (SEM, JEOL 6500, JEOL, Tokyo, Japan)) operating at an accelerating voltage of 5 kV. Samples were coated with platinum (50 Å thickness) before imaging.

A FEI Tecnai G2 F30 transmission electron microscope (TEM) (FEI Co., Hillsboro, Oreg.) equipped with a charge couple device (CCD) and operated at. 300 kV was used for direct imaging of various samples. Samples were prepared by simply sprinkling the powders onto a carbon coated copper grid. For imaging swollen MCM-22(P) from toluene dispersions, a few droplets were placed on a copper grid and allowed to air dry. For one of the polymer nanocomposites, a JEOL 1210 microscope (JEOL, Tokyo, Japan) operating at 120 kV was used for visualization. A Reichert Ultracut S Ultramicrotome (Leica Microsystems GmbH, Wetztar, Germany) equipped with a diamond knife was used for TEM sample preparation to obtain 50-80 nm thick slices of nanocomposite.

Nitrogen adsorption—desorption measurements were carried out at −196° C. on an Autosorb-1 analyzer (Quantachrome Instruments, Boynton Beach, Fla.). Prior to measurement, samples were evacuated overnight at 350° C. and 1 mmHg.

Results and Discussion
XRD and TGA

Figure 2A:
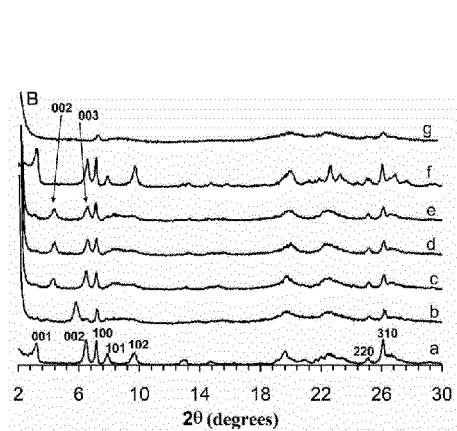
FIG. 2A shows XRD patterns of a) MCM-22(P); material obtained by swelling MCM-22(P) after b) 10 washes; MIN-1 material obtained by swelling MCM-22(P) after c) 20 washes; d) 30 washes and e) 40 washes; f) deswollen material obtained after acidification of MIN-1; and g) MCM-22(PS-80), in embodiments of the present invention.
Figure 2B:
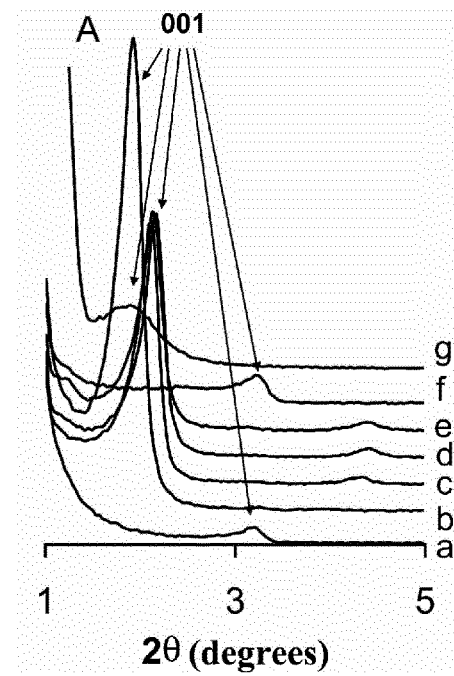
FIG. 2B shows MUD patterns of the 001 peak of FIG. 1A shifted vertically for clarity for a) MCM-22(P); material obtained by swelling MCM-22(P) after b) 10 washes; MIN-1 material Obtained by swelling MCM-22(P) after c) 20 washes, d) 30 washes, and e) 40 washes; 1) deswollen material obtained after acidification of MIN-1; and g) MCM-22 (PS-80), in embodiments of the present invention.

XRD patterns of MCM-22(P) before and after swelling and repeated centrifuging/washing are reported in FIGS. 2A and 2B. The XRD pattern for MCM-22(P) (FIG. 2A, trace a) is in agreement with those reported in the literature. The swollen product shows a shift of the 001 peak to lower angles (FIG. 2A traces b-e) indicating an increase in layer spacing from 27 Å to about 42 Å. Peaks 220 and 310 are unaffected by swelling, indicating preservation of the crystal structure within the layer. The hid peaks along the c-axis (perpendicular to layers) either disappeared or became broader due to the changes in the crystal structure. The 101 and 102 reflections merge together to form a broader peak, as reported in the literature (See, e.g., Roth, W. J.; Vartuli, J. C. *Studies in Surface Science and Catalysis* 2002, 141, (Nanoporous Materials III), 273-279).

Traces b-e in FIG. 2A show the evolution of the swollen structure produced by "repeatedly washing" as defined herein. The swollen material after 10 cycles of washing (Trace b) shows a new peak around a 2θ value of 5.5°. Further washings resulted in disappearance of this peak and emergence of two new peaks around 2θ angles of 4.5° and 6.5°. Also, the 001 peak shifts towards slightly higher angles (FIG. 1B). The two new peaks can be indexed as 002 and 003 based on the position of the 001 peak. These peaks are not present in MCM-22(P) swollen at elevated temperature (MCM-22(PS-80)) according to methods of Corma 1998 and Corma 1999 (FIG. 1A, trace g). Also, the peaks are much broader in MCM-22(PS-80), indicating a greater degree of disorder. The room temperature swelling and repeated washing procedure (as described herein) results in a novel expanded material (MIN-1) with a XRD pattern as shown in FIGS. 2A and 2B, traces b-e) having less broadening of peaks as compared to MCM-22(PS-80). In addition, reflections 002 and 003 were obtained, indicating long range order of layers in the swollen material.

FIG. 3 shows TGA curves for (1) MCM-22(P); swollen material after (2) 10 washes, (3) 20 washes and (4) 40 washes; (5) deswollen material obtained by acidification of MIN-1. The TGA curves (FIG. 3, (2)-(4)) reveal that repeated washings result in a decrease in the organic content, presumably due to removal of CTAB. It is thought that partial removal of CTAB, which might be loosely held in between the layers, results in a more ordered lamellar swollen structure MIN-1 (as evidenced by the emergence of 002 and 003 peaks noted in FIG. 2A).

Si/Al Ratio

The pH at the end of the room temperature swelling procedure was found to be approximately equal to the starting pH of 13.8. On the other hand, the swelling procedures at 80° C. resulted in a significantly lower of 13. These observations can be explained by comparing the Si/Al ratio of the respective materials. MCM-22(P) had a Si/Al ratio of 46.7 as compared to 43.2 for MIN-1 and 11.8 for MCM-22(PS-80). The decrease in Si/Al ratio as a result of swelling indicates some dissolution of framework silica. The dissolved silica forms mono silicic acid and other oligomeric silicates in the solution, which on deprotonation, decrease the pH of the solution. Greater dissolution occurs at elevated temperature.

Reversible Swelling

An unexpected and remarkably surprising feature of the room temperature swelling procedure is that the process can be reversed by acidification, i.e., reversible swelling is unexpectedly possible. FIG. 2A (trace f) shows the XRD pattern of the material obtained by acidification of MIN-1, which appears to be same as that of MCM-22(P). The TGA curve for this material (FIG. 3, trace (5)) shows considerably lower organic content than MIN-1, which suggests the removal of CTAB as a result of acidification. The MUD pattern and the TGA analysis suggest that the acidification results in exchange of CTAB for protons and the layers reassemble to form the MCM-22(P) structure with a characteristic layer spacing of 2.7 nm.

Reversibility of the swelling suggests that HMI, initially present in MCM-22(P), remains in between the layers after swelling and directs the reassembly of the layers to the original MCM-22(P) structure upon CTAB removal. Such reversibility does not occur with MCM-22(PS-80), possibly because the layers are broken due to partial dissolution of framework silica.

Electron Microscopy

SEM images Obtained from the precursor and swollen materials are shown in FIGS. 4A, 4B, 4C and 4D. The MCM-22(P) crystals in FIG. 4A are thin rounded flakes, less than a micron in diameter. Swelling at room temperature, together with 10 and 40 subsequent washes, does not result in any significant changes in the crystal morphology as evidenced by comparing FIGS. 4A, 4B and 4C. However, there are differences in the XRD patterns (FIGS. 1A and B, trace b and trace e) noted above. Swelling at an elevated temperature does produce significant morphological changes as shown in FIG. 4D. The crystals no longer have sharp edges and appear to be highly curled and broken. This is likely due to the dissolution of framework silica.

FIGS. 5A, 5B, 5C and 5D show low magnification TEM images of various samples. MCM-22(P) has a thin flake-like morphology as shown in FIG. 5A, with layers stacked over each other in a lamellar arrangement as shown in FIG. 5B. Swelling at room temperature does not lead to any major changes in the particle morphology, as already seen by SEM and further shown by a TEM micrograph in FIG. 5C. In contrast, FIG. 5D, which shows the morphology of the material swollen at 80° C., clearly shows the loss of lamellar morphology and crystal facets. Layers appear to be curled, partially delaminated and out of registry.

Figure 7A:
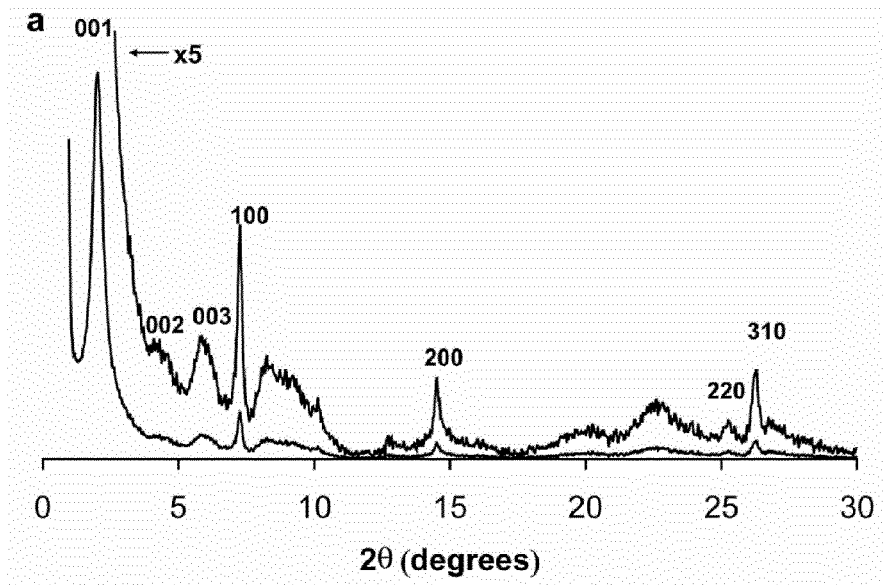
FIG. 7A shows a XRD pattern of MIN-3 obtained by pillaring MIN-1, including a second curve showing a five (5) times magnification in an embodiment of the present invention.

High-resolution TEM (HRTEM) was used to examine the structure of individual layers and the associated gallery spacing. FIGS. 6A, 6B, 6C, 6D, 6E and 6F show TEM micrographs for various specimens. Structural schematics of MCM-22(P) have been overlaid on the TEM micrographs in order to guide visualization, MCM-22(P) in FIG. 6A shows approximately 2.5 nm thick layers. Each layer appears as two dark bands separated by a bright band. The bright band is attributed to the 10-MR pore system within the layer, while the dark bands appear due to the higher silica density in the remaining parts of the layer (top and bottom). The gallery space between the two layers also appears as a bright band. MIN-1 in FIG. 6B displays well-ordered layers with an expanded interlayer distance relative to MCM-22(P). FIG. 6C is a TEM image of the material obtained by acidification of MIN-1. This image shows the layer spacing and structure corresponding to MCM-22(P) and is consistent with FIG. 6A. This provides another piece of evidence, in addition to XRD, for the reversible swelling of MCM-22(P) at room temperature. TEM images of MCM-22(PS-80) are shown in FIGS. 6D, 6E and 6F. MCM-22(PS-80) shows a different morphology than MIN-1. Here, crystals appear to be much more fragmented, with curled layers and amorphous regions. As evidenced by FIGS. 6D and 6E, the layers generally lack the long range ordered stacking obtained for MIN-1. FIG. 6E shows a swollen particle with a part containing well resolved layers and another part that looks amorphous. Although some ordered layers with increased inter layer spacing were observed, as shown in FIG. 6F, such regions make up a minor fraction of the specimen examined. It is concluded that the hot basic conditions used for swelling the sample partly degrade the structure and dissolve the framework silica in some regions, Pillaring of Swollen Materials MIN-1 was pillared to make an analog of MCM-36 designated as MIN-3. FIG. 7A illustrates a XRD pattern obtained after pillaring MIN-1 (with a second curve showing a five (5) times magnification). This pattern is characteristic of a MCM-36 material with an intense low angle 001 peak at the 2θ value of 2°. In contrast to MCM-36, the 002 and 003 reflections are, surprisingly, plainly visible. The presence of these reflections indicates that the material retains long range order even after pillaring and differentiates MIN-3 from MCM-36.

Figure 7B:
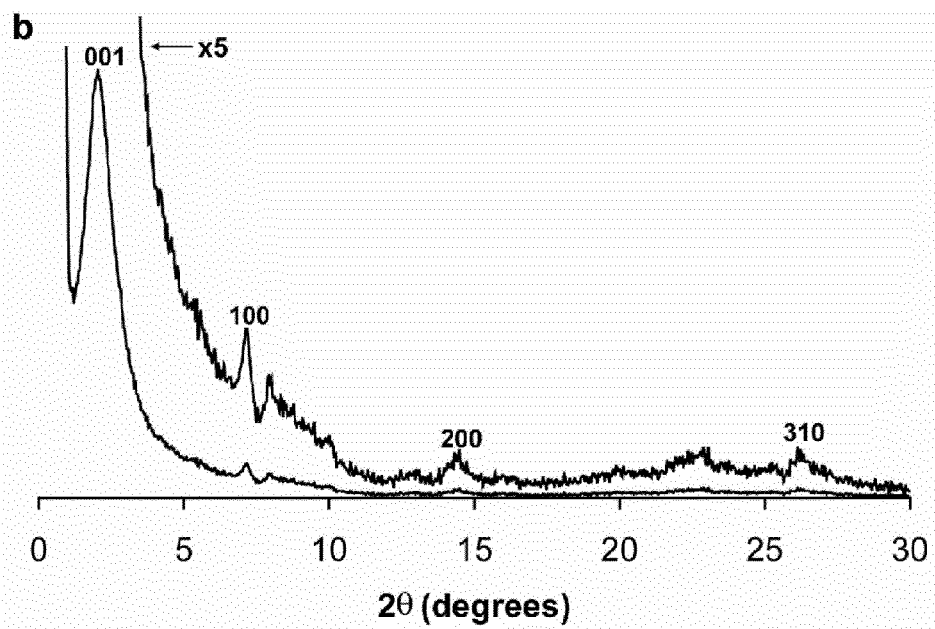
FIG. 7B shows a XRD pattern of MCM-36 obtained by pillaring MCM-22(PS-80), including a second curve showing a five (5) times magnification in an embodiment of the present invention.

FIG. 7B illustrates a pillared material obtained from MCM-22(PS-80) (with a second curve showing a five (5) times magnification). The XRD pattern is grossly similar to MIN-3, except that the peaks are broader and the 002 and 003 reflections are not visible, indicating the absence of long range order.

Figure 8:
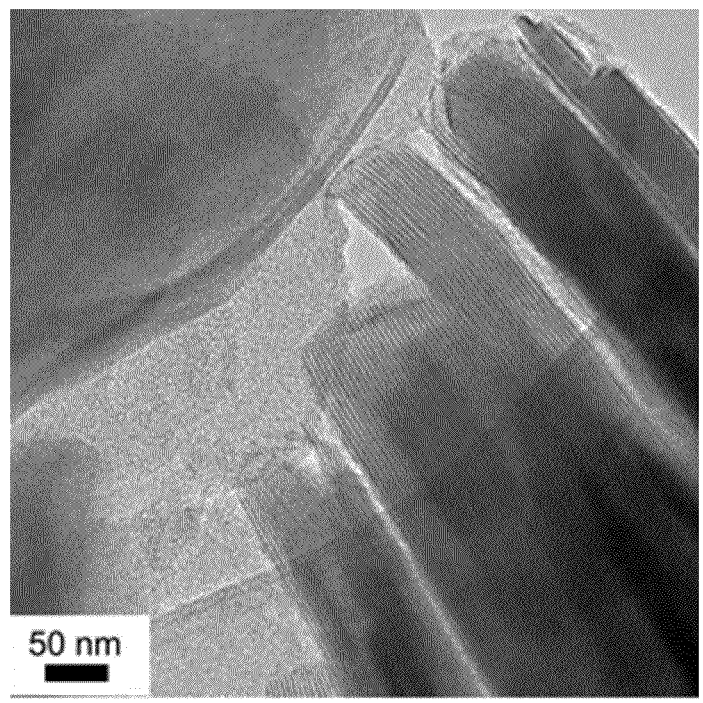
FIG. 8 is a TEM micrograph showing MIN-3 in embodiments of the present invention.

FIG. 8 is a TEM micrograph of MIN-3, obtained by pillaring. This material shows regularly spaced layers (dark lines).

Figure 9:
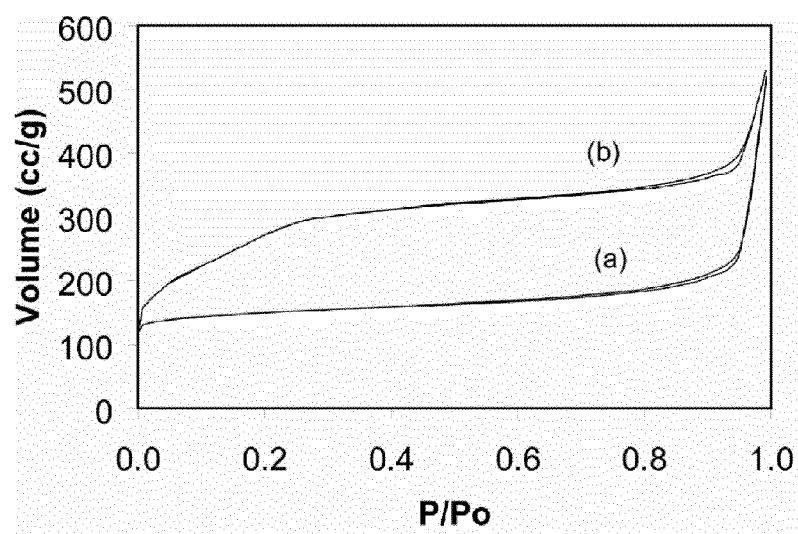
FIG. 9 shows a $N_2$ adsorption/desorption isotherm of (a) MCM-22 and (b) MIN-3 in embodiments of the present invention.

Nitrogen adsorption experiments further confirm successful pillaring. FIG. 9 shows the nitrogen adsorption/desorption curves for MCM-22 and MIN-3. For MIN-3, the increase in adsorption up to a relative pressure ($P/P_0$) of 0.4 clearly indicates the presence of mesoporosity created by pillaring, MCM-22, on the other hand, saturates at a relative pressure of 0.1. The BET surface area (See Brunauer S. et, al., Journal of The American Chemical Society, 60, 309 (1938)) of the pillared material was found to be 934 $m^2/g$, which is significantly higher than the value of 560 $m^2/g$ obtained for MCM-22.

Polystyrene-MIN-2 Nanocomposites

Figure 10:
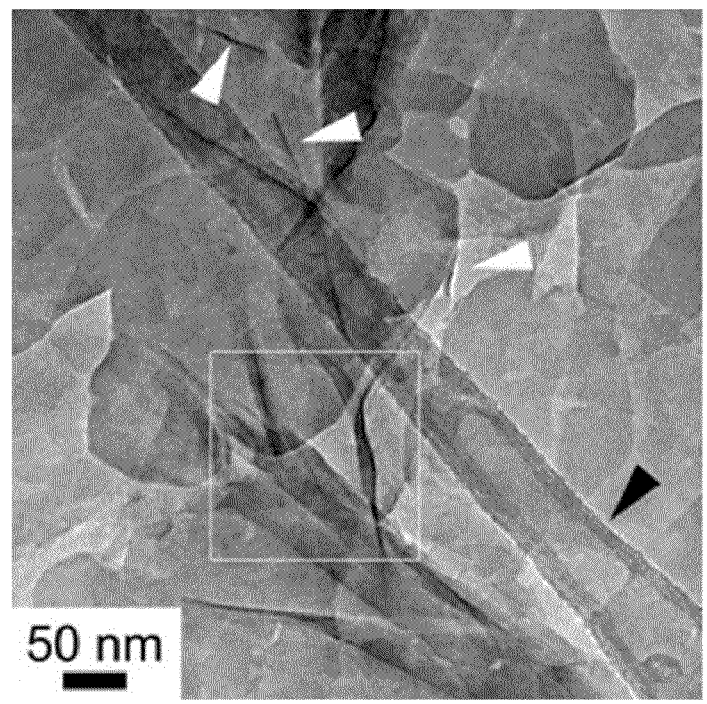
FIG. 10 shows a TEM image of the dispersion of MIN-1 in toluene in embodiments of the present invention.

Polymer-MIN-2 nanocomposites with polystyrene as the choice of polymer were prepared by solvent casting and melt blending techniques. For solvent casting, toluene was found to be a suitable solvent to disperse the swollen material based on the optical clarity of the dispersion. FIG. 10 shows a TEM micrograph of the polystyrene MIN-2 nanocomposite prepared with toluene as the solvent. Exfoliated single layers (indicated by white arrows) are visible along with partially exfoliated and intercalated layered structures (black arrows). The area marked by the white box on the image shows a crystal in the process of exfoliation (as seen by the curving and detachment of layers). Carbon present on the TEM grid used to hold the sample is indicated with a black arrow, to distinguish it from the sample.

Figure 11A:
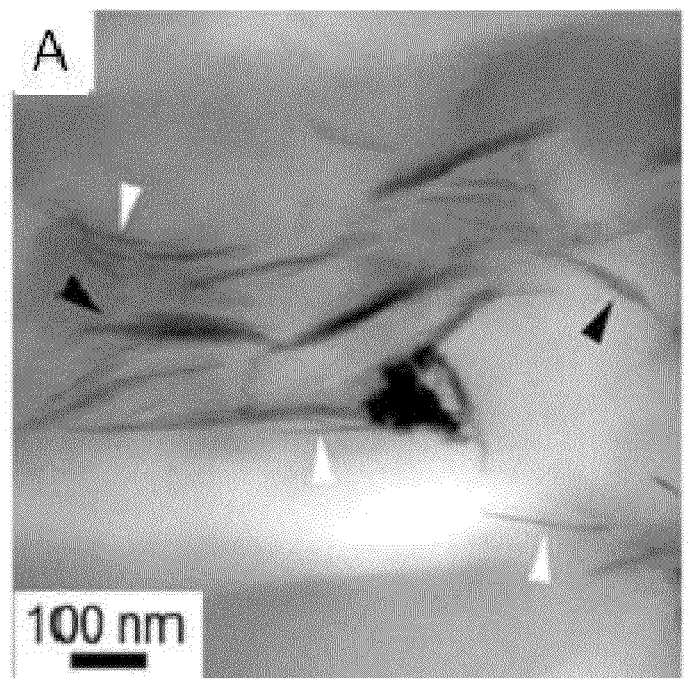
FIG. 11A shows a TEM micrograph of a composite MIN-2 material prepared by solution casting in an embodiment of the present invention.
Figure 11B:
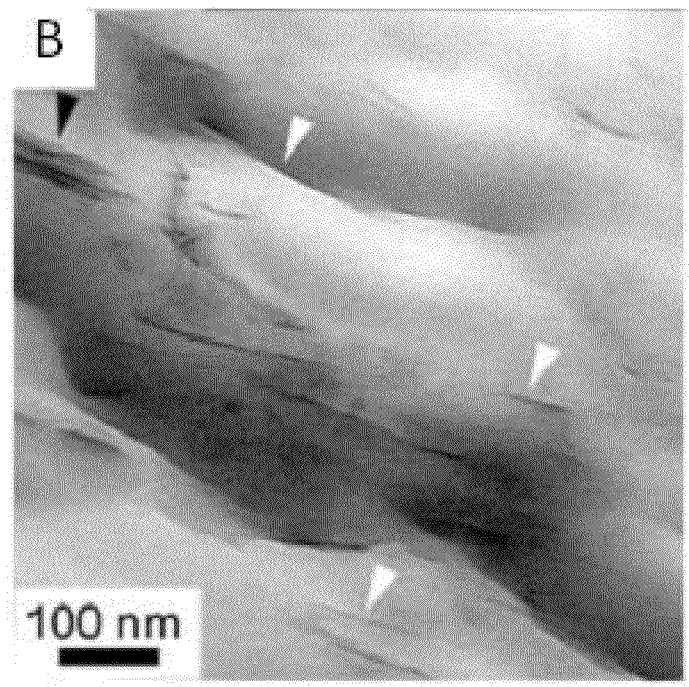
FIG. 11B shows a TEM micrograph of a composite MIN-2 prepared by melt compounding under one set of conditions in an embodiment of the present invention.

FIG. 11A shows a TEM micrograph of the polystyrene-MIN-2 nanocomposite prepared by solution or solvent casting as described above. FIG. 11B shows a TEM micrograph of the polystyrene-MIN-2 nanocomposite prepared by melt compounding. A number of individual exfoliated layers (some indicated by white arrows) along with a polymer-intercalated stack-of-layers (indicated by a black arrow) are visible in both micrographs.

EXAMPLE 2

Polystyrene-MIN-2 Nanocomposites

Figure 11C:
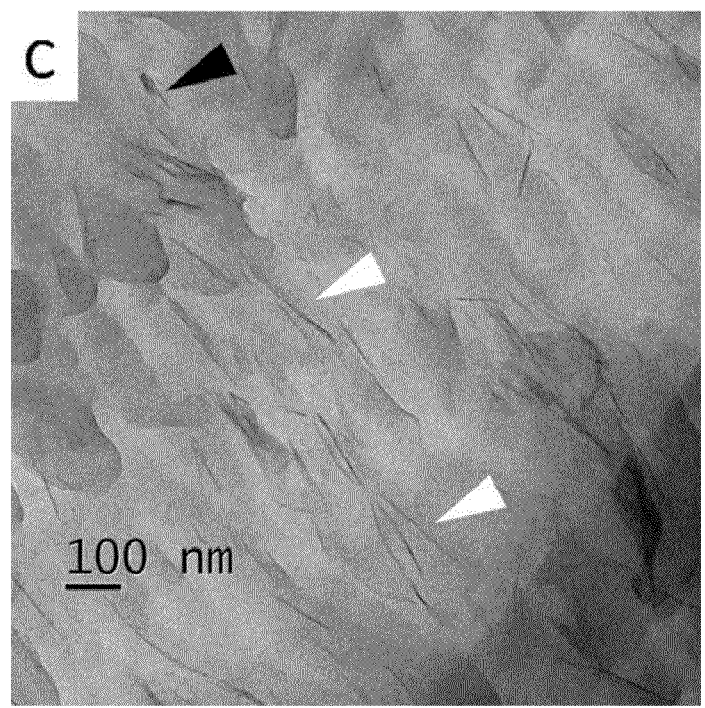
FIG. 11C shows a TEM micrograph of a composite MIN-2 prepared by melt compounding under a second set of conditions in an embodiment of the present invention.

Other nanocomposites were prepared by the melt blending procedure described in Example it except that the mixture was blended sequentially at 120° C. for 10 min, 170° C. for 10 mM, 15° C. for 5 min and 190° C. for five (5) min and finally extruded out at 140° C. A screw speed of 300 rpm was used for blending, instead of the 350 rpm as in Example 1, FIG. 11C shows a TEM micrograph of the nanocomposite prepared under these conditions. FIG. 11C further shows that the extent of exfoliation has improved as compared to FIG. 11A, as seen by a greater number of individual exfoliated layers (some indicated by white arrows) and a very few polymer-intercalated stack of layers (indicated by a black arrow).

EXAMPLE 3

Extraction of Exfoliated MIN-2 from Polystyrene Nanocomposite (i.e., a Composite MIN-2) "Depolymerization"

The polystyrene nanocomposites prepared using the melt compounding technique described in Example 1 were subjected to depolymerization. Specifically, ten (10) g of nanocomposite was placed in a quartz tube and evacuated by connecting to a vacuum pump. At the same time, the tube was heated to 350° C. (40° C. above the ceiling temperature of polystyrene). The heating and evacuation process was continued for six (6) days, during which most of the polystyrene was converted into styrene and escaped from the tube as vapors. Subsequently, the evacuation was stopped and air was blown continuously through the quartz tube. The temperature was then raised to 540° C. to calcine the exfoliated zeolite layers (MIN-2) left behind in the tube. Calcination was continued for approximately five (5) hours, after which tube was cooled to room temperature and MIN-2 powder was removed. The MIN-2 powder was analyzed using XRD and TEM. The XRD pattern produced is shown above in Table 2A.

Figure 12:
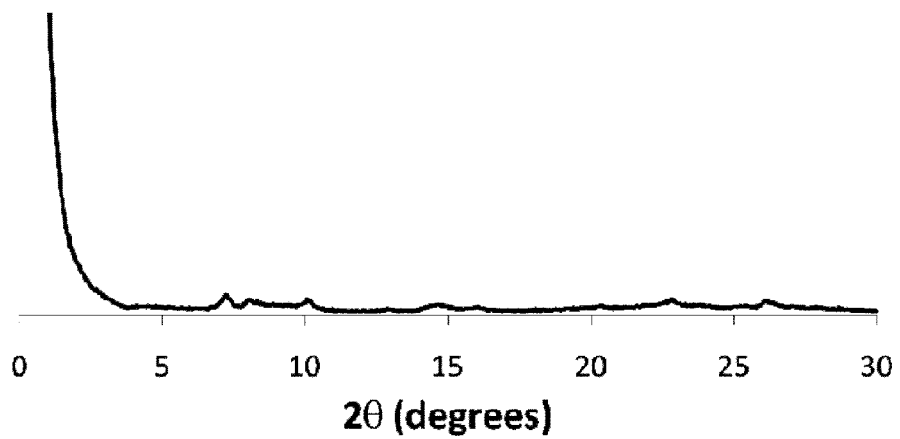
FIG. 12 shows MUD patterns for an exfoliated MIN-2 material in an embodiment of the present invention.

FIG. 12 shows XRD patterns for MIN-2 powder. The XRD peaks of MIN-2 were found to be much broader as compared to MIN-1. This is due to the fact that MIN-2 comprises predominantly exfoliated layers, which do not have correlation with each other.

Figure 13:
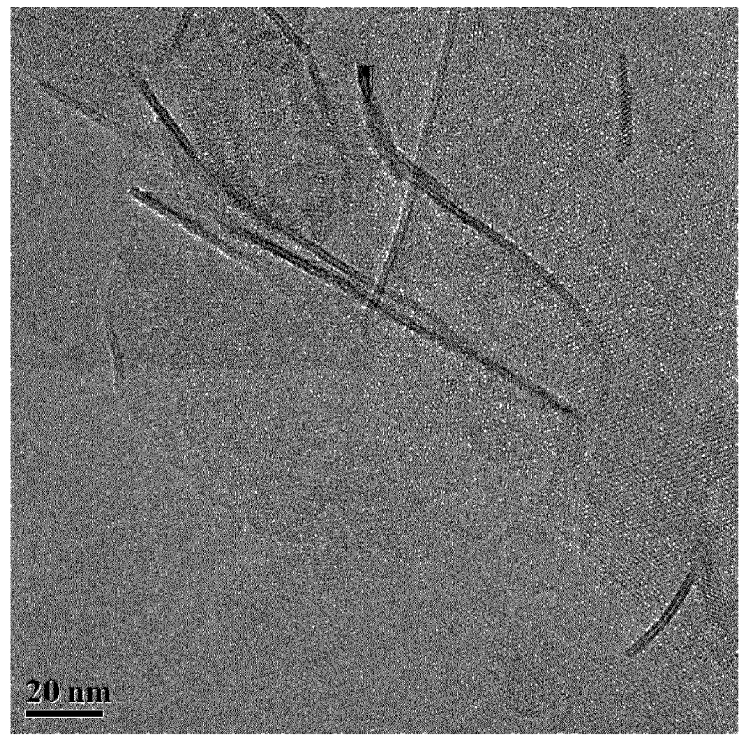
FIG. 13 shows a TEM micrograph of an exfoliated MIN-2 material in an embodiment of the present invention.

FIG. 13 shows a TEM micrograph of a MIN-2 powder. The TEM image of MIN-2 shows highly crystalline exfoliated layers. The pore structure of layers is visible in the edge view of layers. In contrast to conventional materials, the novel materials disclosed herein and shown in the figures, reveal that pore structure and the overall morphology of the layers is preserved.

EXAMPLE 4

Mixed Matrix Using Polymer and MIN-2

The MIN-2 powder obtained in Example 3 was used to make mixed matrix membranes with polysulfone as the polymer of choice using solvent casting technique (see Choi S. et. al, Journal of Membrane Science, 2008, (1-2), 145-152), 0.05 g of MIN-2 powder was dispersed in ten (10) g of tetrahydrofuran (THF) by ultrasonication, followed by successive addition of the 0.01 g of 7.5 wt % potysulfone solution in THY. After 2 h of vigorous stirring at 70° C., 3.5 g of 30 wt % polysulfone solution was added. The mixture was allowed to be mixed for 2 h at 70° C. and then sonicated for 1 h. The mixture solution was poured on a glass plate and cast using doctor's blade and solvent was allowed to evaporate overnight. The membranes were peeled off from the glass surface, annealed under vacuum at 120° C. for 24 hours and tested for separation using the setup described elsewhere (see Choi S. et. al, Journal of Membrane Science, 2008, (1-2), 145-152). For comparison purposes, a pure polymer membrane was also cast using the procedure described above, but without using MIN-2 powder.

The polysulfone-MIN-2 membrane showed a 50% selectivity enhancement for the hydrogen/carbon dioxide pair. The selectivity was found to be about three (3) for the mixed matrix membrane, as compared to two (2) for the pure polymer membrane.

EXAMPLE 5

MCM-22/Silica

The pores of MCM-22 are transport limiting pores which are appropriately sized to separate hydrogen ($H_2$) from carbon dioxide ($CO_2$) and nitrogen ($N_2$). Specifically, $H_2$ can pass through the pores in these crystals, while $N_2$ and $CO_2$ follow a more tortuous path around the crystals.

Figure 14A:
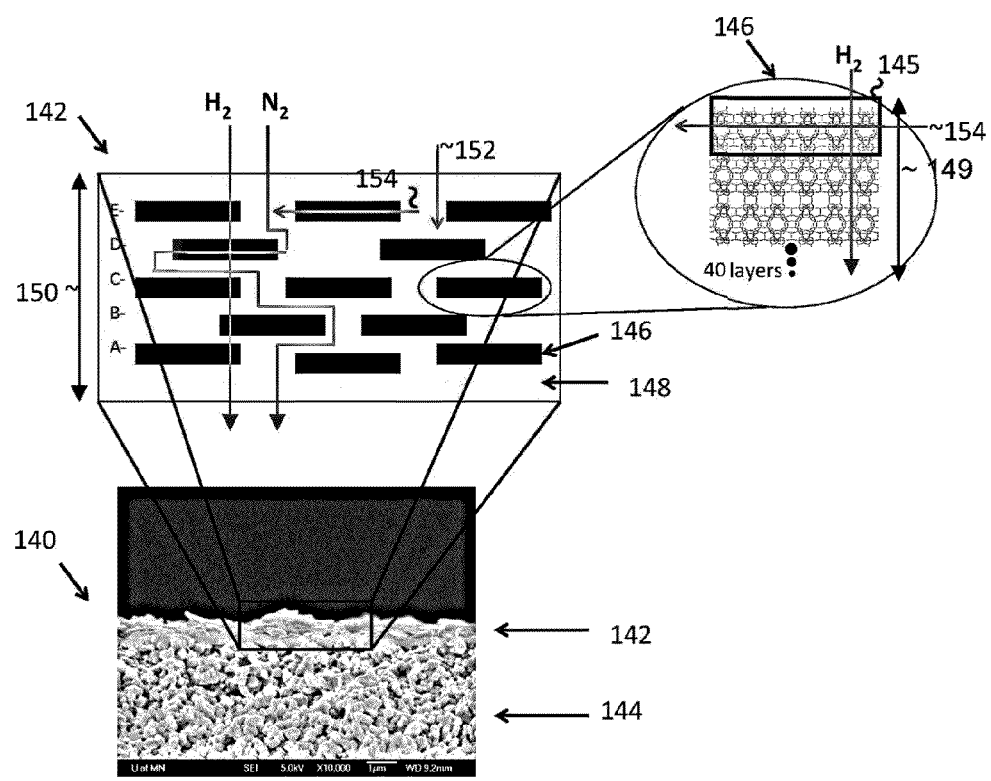
FIG. 14A shows a cross-sectional view SEM image of a MCM-22/silica film together with a schematic showing the flow of hydrogen and nitrogen in an embodiment of the present invention.
Figure 14B:
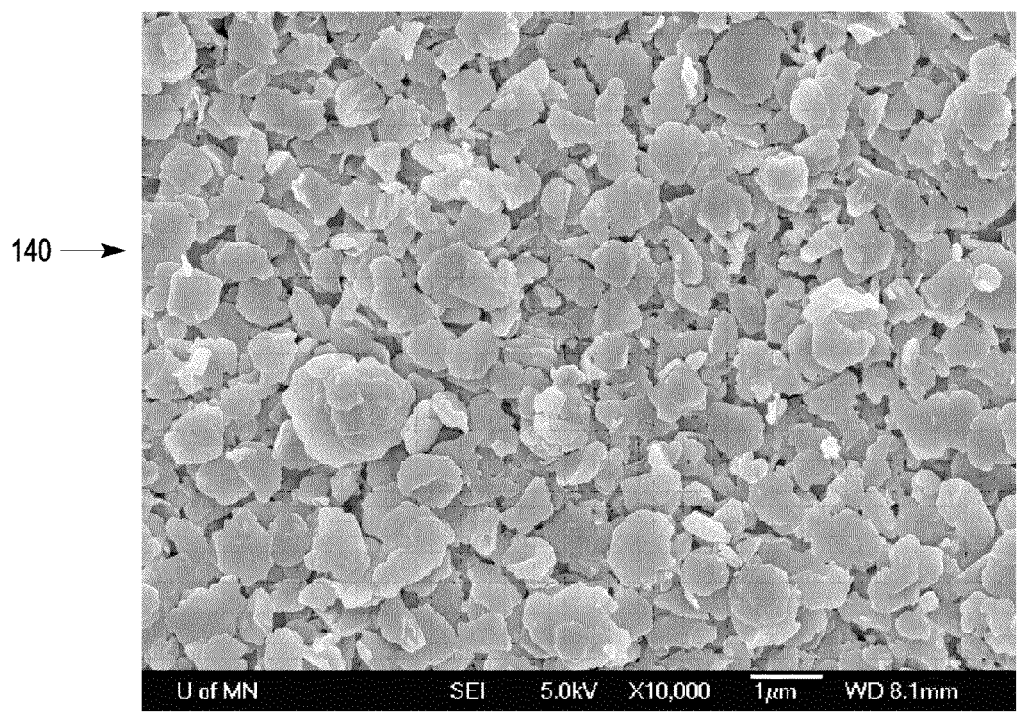
FIG. 14B is a top view SEM image of the film in FIG. 14A in one embodiment of the present invention.

In this testing, as shown in FIG. 14A, MCM-22/silica supported films 140 comprising a MCM-22/silica film 142 and support 144 were produced. In this embodiment, the support 144 is an alumina support. The MCM-22/silica supported films 140 were produced using a layer-by-layer deposition technique to build five alternating layers (A-E) of MCM-22 condensed crystal layer sets 146, shown schematically in FIG. 14A, within a mesoporous silica matrix 148 onto the support 144. Each MCM-22 condensed crystal layer set 146 is disc-shaped and comprised of about 40 layers 145 condensed together. The MCM-22 crystal layer sets 146 were essentially used as tiles for the formation of these films 142. Each MCM-22 crystal layer set 146 is approximately 1000 nm in diameter, has a thickness 149 of about 100 nm, and has approximately 40 transport limiting pores arranged in series (not shown). The total thickness 150 of the film 142 is about 1000 nm. The flow of hydrogen and nitrogen through the film 142 is also shown schematically in FIG. 14A. FIG. 14B further provides a top view of the supported MCM-22/silica film 142 shown in FIG. 14A.

Figure 15A:
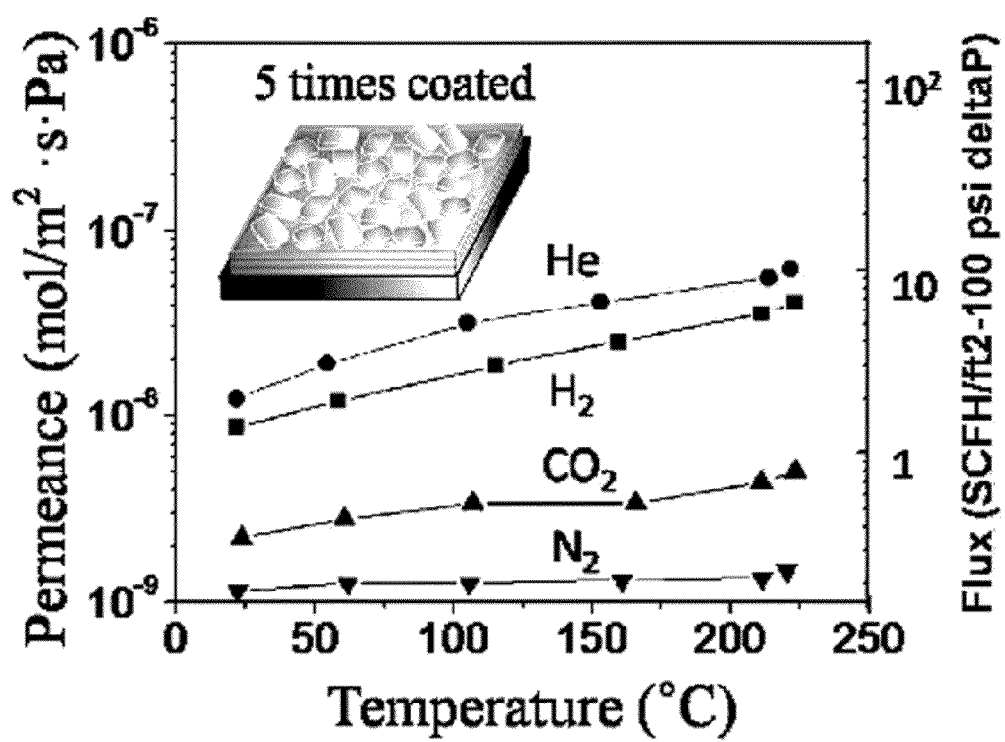
FIG. 15A shows permeability of a MCM-22/silica film for various gases in an embodiment of the present invention.
Figure 15B:
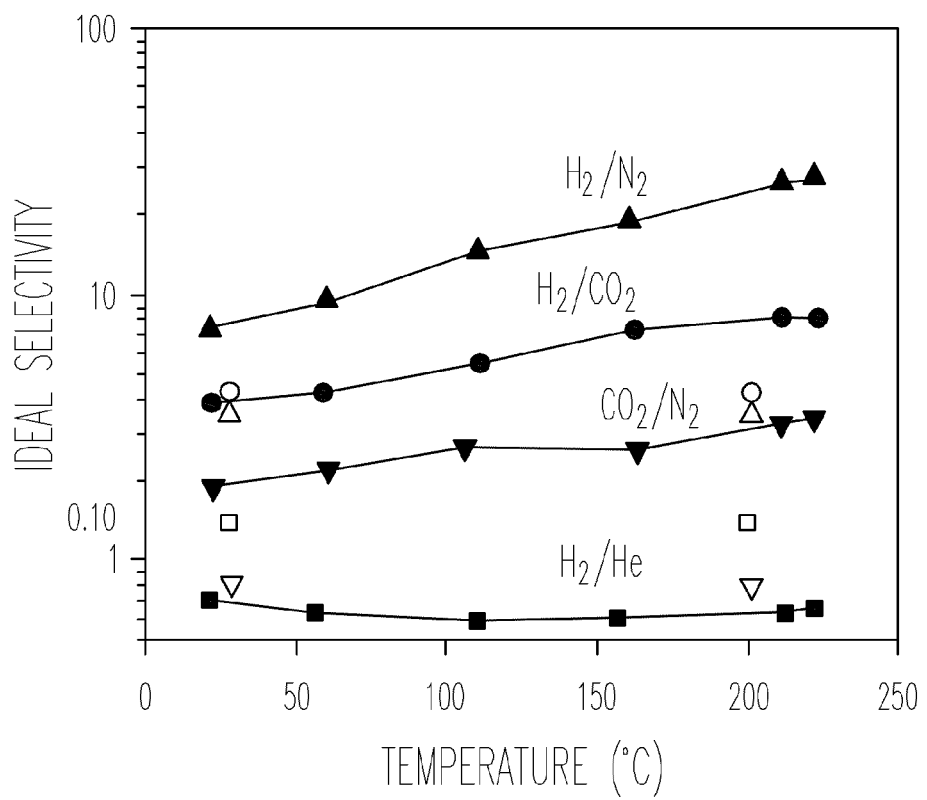
FIG. 15B shows the selectivity of a MCM-22/silica film for various gas pairs in an embodiment of the present invention.

The MCM-22/silica supported films 140 produced herein exhibited $H_2/CO_2$ and $H_2/N_2$ fluxes in the range of 0.005-0.01 mol/m$^2$-s, with one bar trans-membrane pressure difference, as shown in FIG. 15A. In these films, $H_2$ has to cross approximately 40 transport limiting pores per layer of MCM-22 and approximately 200 pores to pass through the entire five-layer thick film. The $H_2/CO_2$ and $H_2/N_2$ ideal selectivities were approximately 10 and 50 respectively, at 220° C., as shown in FIG. 15B. Such results confirm that MCM-22 is capable of greatly enhancing gas separation capability.

Referring again to FIG. 14A, $CO_2$ and $N_2$ not capable of passing through the transport limiting pores of the crystal layer sets 146, pass through larger, more tortuous paths 152 and 154 between the crystal layer sets 146 (path 152) and/or through larger pores of the crystal layer sets 146 (path 154) as shown in FIG. 14A. For hydrogen, the effective thickness of the membrane is the actual 0.5 micron thickness. However, for $CO_2$ and $N_2$ the effective thickness of the film 142 is much larger, because of the tortuous path they have to take. A reasonable estimate of the length of path for these gases is (width of MCM-22 crystal) plus (film thickness), or approximately 5,500 nm.

Figure 16:
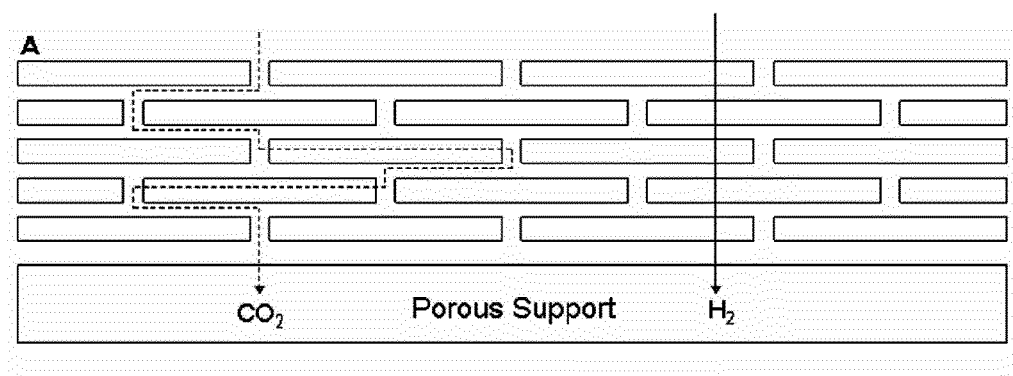
FIG. 16 is a schematic of transport paths for hydrogen and carbon dioxide through a MCM-22 membrane made using MCM-22 disk-shaped crystals in an embodiment of the present invention.

FIG. 16 is a schematic of transport paths for hydrogen and carbon dioxide through a MCM-22 film made using MCM-22 disk-shaped crystals in an embodiment of the present invention.

EXAMPLE 6

LBL Assembly to Make Thin Film Coatings of MIN-2 on Porous Alumina Substrate

Porous substrates of alumina were used for making thin films of MIN-2. The fabrication of substrate has been described elsewhere (Lai, Z.; Tsapatsis, Nicolich, J. P., *Adv. Fund. Mater.* 2004, 14 (7), 716-729). Prior to deposition of films, the alumina support was coated with mesoporous silica to reduce the roughness of substrate using a procedure described elsewhere (J. Choi, Z. Lai, S. Ghosh, D. E. Beving, Y. Yan and M. Tsapatsis, Ind. Eng. Chem. Res. 2007 46 (22) 7096-7106). An aqueous polyelectrolyte solution and aqueous MIN-2 dispersion were prepared for thin film deposition. A one (1) wt % aqueous solution of positively charged polyelectrolyte was prepared by diluting a 20 wt % aqueous solution of poly(diallyldimethylammonium chloride) (PDDA) (Sigma-Aldrich, St. Louis, Mo.) with distilled water. An aqueous dispersion of MIN-2 was prepared by dispersing 0.1 g of MIN-2 powder in 100 g of water, subjecting the dispersion to ultrasonication (Branson 5510, Emerson Electric Co., St. Louis, Mo.) for about 1.5 hrs, leaving the dispersion undisturbed for about 12 hours to allow big agglomerates to settle down, and gently decanting the top fluid leaving behind the settled agglomerates. This decanted fluid was used for making coatings by LBL assembly method.

Thin film coatings were prepared by first dipping a support in a one (1) wt % aqueous polyelectrolyte solution described above, for about five (5) min. The support was then rinsed twice with fresh water for about one (1) minute each (rinsing step), dried for about one (1) minute under air flow (drying step) and then dipped in the aqueous MIN-2 dispersion described above for about five (5) minutes followed by an additional rinsing and drying step. This process was repeated to deposit three alternate layers each of polyelectrolyte and MIN-2, Following the deposition cycles, the substrate-film assembly was heated to 540° C. for approximately five (5) hrs to burn off the polyelectrolyte.

Figure 17A:
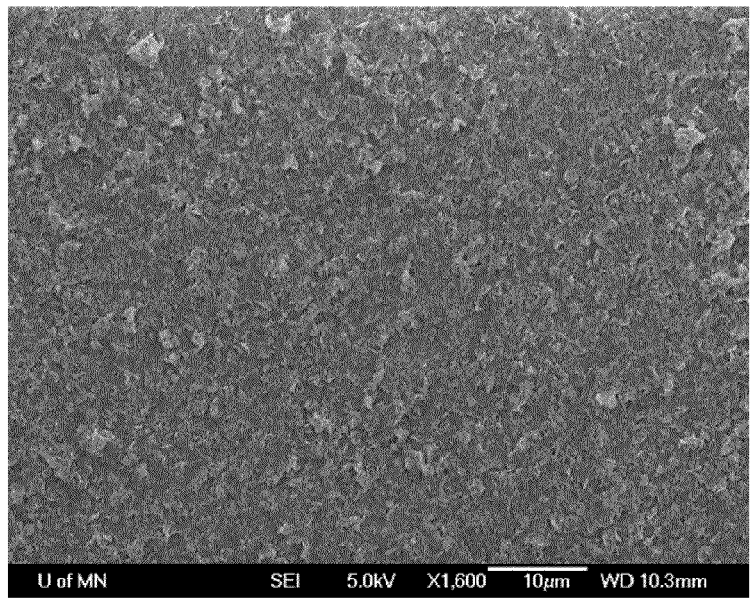
FIGS. 17A and 17B are SEM images of an exfoliated MIN-2 thin film coating on alumina support prepared by a layer-by-layer (LBL) method in an embodiment of the present invention.
Figure 17B:
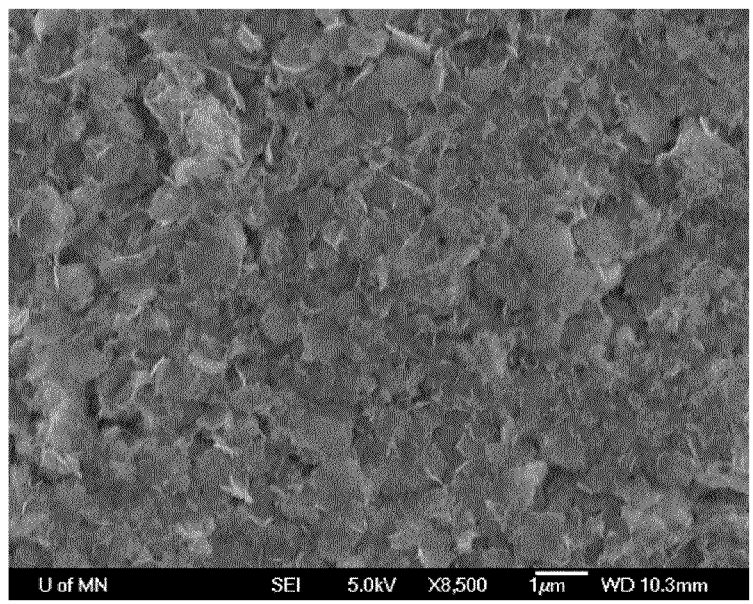

FIGS. 17A and 17B show the SEM images of MIN-2 thin film coating on alumina support prepared by LBL method. The film appears continuous and the support surface is covered with MIN-2. These films can be very useful as hydrogen separation membranes and for corrosion protection applications.

EXAMPLE 7

Prophetic

MIN-2 Films

Figure 18:
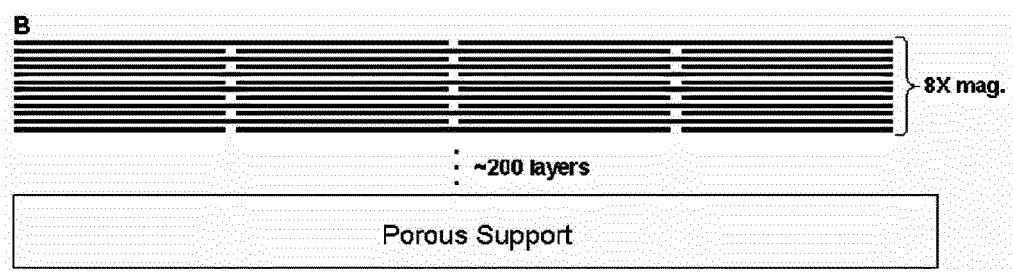
FIG. 18 is a schematic of a membrane made using exfoliated MIN-2 layers in an embodiment of the present invention.
Figure 19:
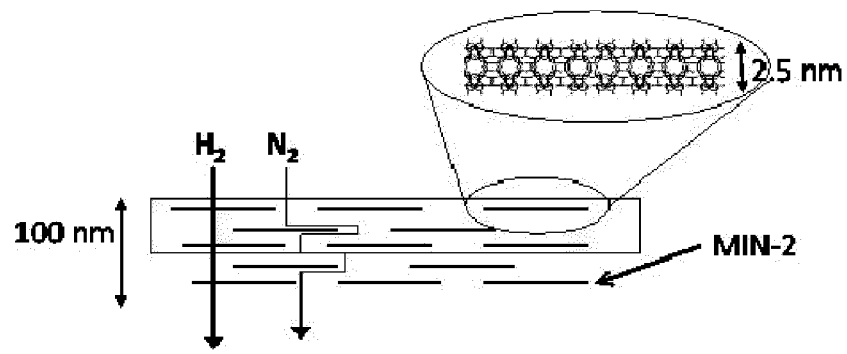
FIG. 19 is a schematic of a composite membrane comprising mesoporous silica/MIN-2 in an embodiment of the present invention.

MIN-2 films will be produced, characterized and tested. FIG. 18 provides a simple schematic of a membrane made using a MIN-2 type material having exfoliated layers, while FIG. 19 shows a simple schematic of a mesoporous silica/MIN-2 composite membrane in an embodiment of the present invention.

The MIN-2 crystals to be used in this testing to make various films comprise thinner tiles having a thickness of about 2.5 nm and a diameter of about 250 nm. Instead of 40 transport limiting pores, each MIN-2 crystal has only one such pore. One transport limiting pore thick crystals are expected to be sufficient for separation of hydrogen, when stacked on top of each other.

A deposit of the same 0.5 micron thickness film will be made as discussed above in the MCM-22/silica films in Example 5. However, the resulting film will contain approximately 200 MIN-2 tiles, as compared with the approximately five (5) with the MCM-22 crystals. It is expect that $H_2$ will experience no significant additional resistance, since its dominant transport pathway of diffusion through the pores remains similar. However, $CO_2$ and $N_2$ will experience an increasingly tortuous path for transport as the number of layers and, correspondingly, their overlapping increases.

For the membrane containing 200 layers of MIN-2 (2.5 nm)×(250 nm), it is estimated that the tortuous path is approximately 50,500 nm, which represents at least a ten-fold increase from the MCM-22/silica films discussed in Example 5. The expected selectivity of these membranes at 220° C. is therefore expected to be at least ten times better than MCM-22/silica films giving $H_2/CO_2$, $H_2/N_2$ selectivity and $H_2$ permeance of 100, 500, and 0.005-0.01 mol/$m^2$-s-bar, respectively.

Additional testing is expected to result in films which are less than 0.5 microns in thickness, but not eight times thinner than the MCM-22/silica films of Example 5. As a result, such films are expected to have a selectivity enhancement of at least one (1) to ten (10) times the selectivity demonstrated by the MCM-22/silica films of Example 5. Such films are also expected to have a permeability enhancement of at least one to eight (8) times the permeability of the MCM-22/silica films of Example 5. However, the exact level of selectivity and permeability enhancement will depend on the actual thickness of the film. In one embodiment, such films may demonstrate at least an eight-fold increase in flux, thus reaching an expected value of 0.04 to 0.08 mol/$m^2$-s-bar.

Thus, films of MIN-2 have tremendous potential as hydrogen separation membranes for applications like clean coal energy plants.

CONCLUSION

In one embodiment, the invention provides a novel oxide material (MIN-1) comprising $YO_2$; and $X_2O_3$, wherein Y is a tetravalent element and X is a trivalent element. In one embodiment, X/Y=0. In one embodiment, Y/X=30 to 100 is provided. MIN-1 is a swollen material derived from MCM-22(P) having a different x-ray diffraction pattern as compared to swollen MCM-22(P) prepared by conventional methods. MIN-1 has a highly ordered structure with increased layer spacing, and exhibits little or no degradation of in-plane layer morphology. In one embodiment, MIN-1 is produced by swelling under high pH conditions (i.e., at 13.6 r above) followed by repeated washings with water. 1.11 one embodiment, MIN-1 is produced at room temperature conditions.

An unexpected and surprising feature of the swollen material is that it can be reversibly deswollen back to MCM-22(P) by acidification, thus indicating a high degree of layer structure preservation upon swelling. This is in contrast to the material produced by conventional high temperature swelling processes, which cannot be reversed back to MCM-22(P) structure. The swelling procedure described herein is well suited for polymer nanocomposite and thin coating fabrication, which requires swelling of MCM-22(P) layers with retention of crystal structure to maintain the high aspect ratio of the layers.

MIN-1 may further be pillared to produce a pillared material designated as MIN-3, which retains layers with composition and structure closer to the one present in MCM-22(P). MIN-3 is expected to have distinct catalytic and stability properties as compared to conventional pillared materials.

MIN-1 can further be combined with a polymer (i.e., polymer matrix) to produce a nanocomposite having predominantly exfoliated layers with a few intercalated crystals and designated herein as composite MIN-2. The polymer may be removed from composite MIN-2, such as be depolymerization, produce MIN-2. MIN-2 is expected to be useful in a wide range of applications, such as catalysts, thin films and coatings.

All of the publications, patents and patent documents are incorporated by reference herein, each in their entirety, as though individually incorporated by reference. In the case of any inconsistencies, the present disclosure, including any definitions therein, will prevail. The numbered references correspond to footnotes throughout the application.

Although specific embodiments have been illustrated and described herein, it will be appreciated by those of ordinary skill in the art that any procedure that is calculated to achieve the same purpose may be substituted for the specific embodiments shown. For example, the method used for exfoliation discussed herein may be useful for a variety of layered materials such as clays and aluminum phosphates. This application is intended to cover any adaptations or variations of the present subject matter. Therefore, it is manifestly intended that embodiments of this invention be limited only by the claims and the equivalents thereof.

What is claimed is:

1. A method comprising reversibly swelling an oxide material to produce an unwashed swollen layered oxide material, the oxide material having a first layer structure; and washing the unwashed swollen layered oxide material with water to produce a washed swollen layered oxide material having a second layer structure substantially the same as the first layer structure and an X-ray diffraction pattern comprising:

| d(Å) | 100 I/I$_0$ |
|---|---|
| 40.7 ± 1.8 | vs |
| 20 ± 0.38 | w |
| 13.4 ± 0.17 | w |
| 12.3 ± 0.14 | w |
| 10.45 ± 0.1 | w |
| 9.3 ± 0.08 | w |
| 6.7 ± 0.04 | w |
| 4.4 ± 0.03 | w |
| 3.9 ± 0.03 | w |
| 3.5 ± 0.03 | w |
| 3.4 ± 0.03 | w |
| 3.3 ± 0.03 | w, | wherein d(Å)=interplanar spacing;
I=peak height intensity;
I$_0$=intensity of strongest peak:,
100 I/I$_0$=relative peak intensity;
vs=greater than 60 up to about 100; and
w=zero up to about 20; and wherein the oxide material is a layered oxide material which is swollen at room temperature.

2. The method of claim 1 wherein the second layer structure is the same as the first layer structure.

3. The method of claim 1 further comprising unswelling the washed swollen layered oxide material to produce the oxide material.

4. The method of claim 1 further comprising pillaring the washed swollen layered oxide material to produce a pillared layered oxide material having an X-ray diffraction pattern comprising:

| d(Å) | 100 I/I$_0$ |
|---|---|
| 43.9 ± 1.9 | vs |
| 20.6 ± 0.4 | w |
| 15.1 ± 0.21 | w |
| 12.2 ± 0.14 | w |
| 10.7 ± 0.14 | w |
| 9.2 ± 0.14 | w |
| 6.9 ± 0.05 | w |
| 6.1 ± 0.04 | w |
| 4.4 ± 0.03 | w |
| 3.9 ± 0.03 | w |
| 3.5 ± 0.03 | w |
| 3.4 ± 0.03 | w |
| 3.3 ± 0.03 | w, | wherein the oxide material is a pillared oxide catalyst and
d(Å)=interplanar spacing;
I=peak height intensity;
I$_0$=intensity of strongest peak;
100 I/I$_0$=relative peak intensity;
vs=greater than 60 up to about 100; and
w=zero up to about 20.

5. The method of claim 1 further comprising combining the washed swollen layered oxide material with a polymer to produce a composite.

6. The method of claim 5 wherein the composite is made with solvent casting and the polymer is a polystyrene, polypropylene, polyolefin, polymethacrylate, polyvinylalcohol, polyacrylamide, polycaprolactone, a copolymer of ethylene, a copolymer of propylene, a copolymer of acetate, poly(ethylene terephthalate), nylon, polysulfone, polyimide, polyamidimide, polybenzaimidazole, or any combination thereof.

7. The method of claim 4 wherein the composite is made with melt extrusion and the polymer is a polystyrene, polypropylene, polyolefin, polymethacrylate, polyvinylalcohol, polyacrylamide, polycaprolactone, a copolymer of ethylene, a copolymer of propylene, a copolymer of acetate, poly(ethylene terephthalate), nylon or any combination thereof.

8. The method of claim 7 further comprising removing the polymer from the composite to produce an exfoliated layered oxide material having an X-ray diffraction pattern comprising:

| d(Å) | 100 I/I$_0$ |
|---|---|
| 20.06 ± 1.35 | w-m |
| 12.20 ± 0.13 | vs |
| 10.93 ± 0.16 | s |
| 8.76 ± 0.09 | s |
| 6.80 ± 0.05 | w |
| 6.04 ± 0.04 | m-s |
| 5.52 ± 0.03 | w |
| 4.37 ± 0.03 | w |
| 3.89 ± 0.02 | m-s |
| 3.74 ± 0.02 | w-m |
| 3.51 ± 0.04 | w |
| 3.41 ± 0.01 | vs-m |
| 3.28 ± 0.01 | w |
| 3.17 ± 0.01 | w, | wherein d(Å)=interplanar spacing;
I=peak height intensity;
I$_0$=intensity of strongest peak;
100 I/I$_0$=relative peak intensity;
vs=greater than 60 up to about 100;
s=greater than 40 up to about 60;
m=greater than 20 up to 40; and
w=zero up to about 20.

9. The method of claim 8 wherein the polymer is removed by depolymerizing the composite with calcination or by dissolving the composite in a solvent to produce exfoliated layers and separating the exfoliated layers.

10. The method of claim 8 further comprising forming a film or a coating on a support.

* * * * *

UNITED STATES PATENT AND TRADEMARK OFFICE
CERTIFICATE OF CORRECTION

| | |
|---|---|
| PATENT NO. | : 8,501,068 B2 |
| APPLICATION NO. | : 12/741178 |
| DATED | : August 6, 2013 |
| INVENTOR(S) | : Tsapatsis et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 583 days.

Signed and Sealed this
Twenty-fifth Day of February, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,501,068 B2
APPLICATION NO. : 12/741178
DATED : August 6, 2013
INVENTOR(S) : Tsapatsis et al.

It is certified that error appears in the above-identified patent and that said Letters Patent is hereby corrected as shown below:

On the title page, in column 2, References Cited under "Other Publications", line 1, delete "PCT/US2008/012455 ," and insert --PCT/US2008/012455,--, therefor On the title page, in column 2, under "(57) Abstract", line 1, delete "(MIN-I)" and insert --(MIN-1)--, therefor On the title page, in column 2, under "(57) Abstract", line 3, delete "X/Y=O" and insert --X/Y=0--, therefor On the title page, in column 2, under "(57) Abstract", line 4, delete "MIN-I" and insert --MIN-1--, therefor On the title page, in column 2, under "(57) Abstract", line 4, delete "MIN-I" and insert --MIN-1--, therefor On page 2, in column 2, References Cited under "Other Publications", line 1, delete "PCT/US2008/012455 ," and insert --PCT/US2008/012455,--, therefor On page 2, in column 2, References Cited under "Other Publications", line 3, delete "Preservatin" and insert --Preservation--, therefor In the specification In column 1, line 52-53, delete "diffraetometer" and insert --diffractometer--, therefor In column 2, line 42, delete "interplanar," and insert --interplanar--, therefor Signed and Sealed this
Third Day of November, 2015

Michelle K. Lee
*Director of the United States Patent and Trademark Office*

CERTIFICATE OF CORRECTION (continued)
U.S. Pat. No. 8,501,068 B2

In the specification

In column 2, line 52, delete "MCM-22(9)" and insert --MCM-22(P)--, therefor

In column 2, line 62, delete "nanocomposite." and insert --nanocomposite".--, therefor In column 3, line 5, before "polysulfone," insert --nylon,--, therefor In column 3, line 6, delete "polybenzaimidazole," and insert --polybenzimidazole,--, therefor In column 3, line 63, delete "interplanar," and insert --interplanar--, therefor In column 4, line 5, delete "d(A)" and insert --d(Å)--, therefor In column 4, line 6, delete "12.1" and insert --12.2--, therefor In column 4, line 62, delete "d(A)" and insert --d(Å)--, therefor In column 6, line 46, delete "MUD" and insert --XRD--, therefor In column 6, line 49, delete "Obtained" and insert --obtained--, therefor In column 6, line 50, delete "1)" and insert --f)--, therefor In column 6, line 54, delete "Obtained" and insert --obtained--, therefor In column 7, line 4, after "edge-on-view", insert --.--, therefor In column 7, line 5, delete "MINI" and insert --MIN-1--, therefor In column 7, line 41, delete "MUD" and insert --XRD--, therefor In column 8, line 30, delete "et al," and insert --et al.,--, therefor In column 8, line 33, delete "et al," and insert --et al.,--, therefor In column 9, line 13, after "e", insert --in--, therefor In column 9, line 30, after "i.e.", insert --i.e.,--, therefor In column 9, line 30, after "MCM-22(P).", insert --MCM-22(P),--, therefor In column 9, line 59, after "OF", insert --Of--, therefor In column 10, line 67, delete "100I/$I_0$" and insert --100 I/$I_0$--, therefor In the specification In column 11, line 67, delete "polybenzaimidazole," and insert --polybenzimidazole,--, therefor In column 12, line 25, delete "novel-MIN-2" and insert --novel MIN-2--, therefor In column 12, line 26, delete "layer-by layer" and insert --layer-by-layer--, therefor In column 12, line 59, delete "embodiment;" and insert --embodiment,--, therefor In column 13, line 4, delete "2A:" and insert --3A:--, therefor In column 13, line 16, delete "relative to" and insert --than--, therefor In column 13, line 48, after "MCM-22(P)", insert --.--, therefor In column 13, line 50, delete "Corma et al.," and insert --Corma, et al.,--, therefor In column 13, line 51, delete "Corma, et al," and insert --Corma, et al.,--, therefor In column 14, line 1, after "Swelling", insert --of--, therefor In column 14, line 1, delete ":" and insert --;--, therefor In column 14, line 16, delete "Water" and insert --water--, therefor In column 14, line 25, delete "351 K" and insert --351° K.--, therefor In column 14, line 29, delete "313 K," and insert --313° K.,--, therefor In column 14, line 32, delete "2 K/min)." and insert --2° K/min).--, therefor In column 14, line 37, delete "Choi S. et. al," and insert --Choi, S., et al.,--, therefor In column 14, line 62, after "extrudate", insert --at--, therefor In column 15, line 8, after "C./min", insert --)--, therefor In column 15, line 12, delete "Japan))" and insert --Japan)--, therefor In column 15, line 17, delete "at." and insert --at--, therefor In column 15, line 24, after "S", insert --.--, therefor In column 15, line 25, delete "Wetztar" and insert --Wetzlar--, therefor In the specification In column 15, line 44, delete "hid" and insert --hkl--, therefor In column 16, line 18, after "lower", insert --pH--, therefor In column 16, line 36, delete "MUD" and insert --XRD--, therefor In column 16, line 49, delete "Obtained" and insert --obtained--, therefor In column 17, line 11, delete "visualization," and insert --visualization.--, therefor In column 17, line 40, delete "regions," and insert --regions.--, therefor In column 17, line 58-59, after "pillaring", insert --MIN-1--, therefor In column 17, line 64, after "pillaring", insert --pillaring.--, therefor In column 17, line 66, after "et,", insert --et--, therefor In column 18, line 33, delete "it" and insert --1,--, therefor In column 18, line 35, delete "mM" and insert --min--, therefor In column 18, line 35, delete "15° C." and insert --150° C.--, therefor In column 18, line 37, delete "1," and insert --1.--, therefor In column 18, line 48, after "MIN-2)", insert --by--, therefor In column 19, line 20-21, delete "Choi S. et. al," and insert --Choi, S., et al.,--, therefor In column 19, line 24, delete "potysulfone" and insert --polysulfone--, therefor In column 19, line 25, delete "THY" and insert --THF--, therefor In column 19, line 32-33, delete "Choi S. et. al," and insert --Choi, S., et al.,--, therefor In column 19, line 45, after "Silica", insert --Films--, therefor In column 20, line 39, after "Tsapatsis", insert --M.;--, therefor In column 20, line 40, delete "Fund." and insert --Funct.--, therefor In column 21, line 1, delete "MIN-2," and insert --MIN-2.--, therefor

CERTIFICATE OF CORRECTION (continued)
U.S. Pat. No. 8,501,068 B2

In the specification

In column 22, line 10, delete "1.11" and insert --In--, therefor

In column 22, line 35, before "produce", insert --to--, therefor

In the claims

In column 23, line 17, in Claim 1, delete "peak:," and insert --peak;--, therefor In column 23, line 20, in Claim 1, before "and" insert --¶--, therefor